United States Patent
Bernsen

(10) Patent No.: US 10,149,153 B2
(45) Date of Patent: Dec. 4, 2018

(54) WIRELESS COMMUNICATION SYSTEM

(71) Applicant: KONINKLIJKE PHILIPS N.V., Eindhoven (NL)

(72) Inventor: Johannes Arnoldus Cornelis Bernsen, Eindhoven (NL)

(73) Assignee: KONINKLIJKE PHILIPS N.V., Einhoven (NL)

( * ) Notice: Subject to any disclaimer, the term of this patent is extended or adjusted under 35 U.S.C. 154(b) by 49 days.

(21) Appl. No.: 14/434,886

(22) PCT Filed: Sep. 16, 2013

(86) PCT No.: PCT/IB2013/058567
§ 371 (c)(1),
(2) Date: Apr. 10, 2015

(87) PCT Pub. No.: WO2014/060873
PCT Pub. Date: Apr. 24, 2014

(65) Prior Publication Data
US 2015/0271667 A1  Sep. 24, 2015

(30) Foreign Application Priority Data

Oct. 15, 2012  (EP) .................................... 12188491
May 29, 2013  (EP) .................................... 13169721

(51) Int. Cl.
*H04W 12/04*  (2009.01)
*H04L 29/06*  (2006.01)
(Continued)

(52) U.S. Cl.
CPC .......... *H04W 12/04* (2013.01); *H04B 5/0031* (2013.01); *H04L 9/0844* (2013.01);
(Continued)

(58) Field of Classification Search
CPC .... H04W 12/04; H04L 9/0841; H04L 9/0844; H04L 63/061; G06F 21/445
See application file for complete search history.

(56) References Cited

U.S. PATENT DOCUMENTS 9,088,565 B2   7/2015  Cuellar
9,445,449 B2   9/2016  Dees
(Continued)

FOREIGN PATENT DOCUMENTS

EP   1335563 A2      8/2003
JP   2011239146 A    11/2011
(Continued)

OTHER PUBLICATIONS

Wi-Fi Alliance: "Wi-Fi Certified for Wi-Fi Protected Setup: Easing the User Experience for Home and Small Office Wi-Fi Networks", Internet Citation, 2007, pp. 1-14.
(Continued)

*Primary Examiner* — David J Pearson
(74) *Attorney, Agent, or Firm* — Larry Liberchuk

(57) ABSTRACT

A wireless communication system comprises two communication units (101, 03) which exchange public key identification data using both Near Field Communication (NFC) and Wi-Fi. Comparators (213) compare the public key identification data received over NFC to that received over Wi-Fi. If they do not match, communication controllers (203, 303) terminate a Wi-Fi communication, and specifically may terminate a secure Wi-Fi communication setup. If the public key identification data match, the communication controllers (203, 303) determine matching session keys and network keys from the public key identification data. The approach utilizes a full two-way device authentication based on two-way NFC communications to provide increased security and robustness to e.g. man-in-the-middle attacks.

16 Claims, 3 Drawing Sheets

(51) Int. Cl.
*H04L 9/08* (2006.01)
*H04L 9/32* (2006.01)
*H04B 5/00* (2006.01)
*H04W 12/06* (2009.01)
*H04W 4/80* (2018.01)

(52) U.S. Cl.
CPC ............ *H04L 9/3215* (2013.01); *H04L 63/06* (2013.01); *H04L 63/061* (2013.01); *H04L 63/1466* (2013.01); *H04L 63/18* (2013.01); *H04W 4/80* (2018.02); *H04W 12/06* (2013.01); *H04L 2209/805* (2013.01)

(56) References Cited

U.S. PATENT DOCUMENTS

| | | | |
|---|---|---|---|
| 2003/0120925 A1* | 6/2003 | Rose | G06Q 20/341 713/176 |
| 2003/0149874 A1* | 8/2003 | Balfanz | H04L 63/0492 713/168 |
| 2004/0250082 A1* | 12/2004 | Li | H04L 9/3247 713/181 |
| 2005/0273609 A1 | 12/2005 | Eronen | |
| 2006/0251256 A1 | 11/2006 | Asokan | |
| 2007/0076879 A1* | 4/2007 | Asokan | H04L 9/0844 380/255 |
| 2008/0031459 A1* | 2/2008 | Voltz | H04L 9/083 380/279 |
| 2009/0222659 A1* | 9/2009 | Miyabayashi | H04L 63/0823 713/156 |
| 2009/0307492 A1 | 12/2009 | Cao | |
| 2009/0327724 A1* | 12/2009 | Shah | H04L 9/3271 713/169 |
| 2011/0185037 A1* | 7/2011 | Tiedemann | G06F 17/30887 709/217 |
| 2012/0077432 A1 | 3/2012 | Rose | |
| 2012/0284517 A1* | 11/2012 | Lambert | H04L 63/0823 713/169 |
| 2013/0036231 A1* | 2/2013 | Suumaki | H04W 12/04 709/228 |
| 2013/0067214 A1* | 3/2013 | Tanaka | H04L 9/0822 713/150 |

FOREIGN PATENT DOCUMENTS

JP WO 2011142353 A1 * 11/2011 .......... H04L 9/0822
WO WO2014033199 A1 3/2014

OTHER PUBLICATIONS

Wi-Fi Alliance: "Wi-Fi Protected Setup Specification Version 1.0h", Dec. 31, 2006, pp. 1-110.
Yoshida, J., "Tests Reveal e-Passport Security Flaw", EE Times, Connecting teh Global Electrinics Community, pp. 1-3, Aug. 30, 2004 http://www.eetimes.com/electronics-news/4049950/Tests-reveal-e-passport-security-flaw.
Wi-Fi Simple Configuration Protocol and Usability Best Practices for the Wi-Fi Protected Setup Program, Version 2.0.1, Apr. 2011, Wi-Fi Alliance.
Hancke, G.P., "Practical Attacks on Proximity Identification Systems", University of Cambridge, pp. 1-19, May 26, 2006 http://www.rfidblog.org.uk/Hancke-IEEESP2006-pres.pdf.

* cited by examiner

WIRELESS COMMUNICATION SYSTEM

FIELD OF THE INVENTION

The invention relates to authentication in a wireless communication system, and in particular, but not exclusively, to setting up of Wi-Fi communications between communication units.

BACKGROUND OF THE INVENTION

Wireless communication systems have become ubiquitous and provide flexible and efficient support for many communication applications including mobile communication applications. One widespread set of wireless communication standards is the Wi-Fi family of communication standards which is for example used in many homes to provide wireless networking and Internet access. The Wi-Fi family of communication standards includes amongst others the widespread the IEEE 802.11a, IEEE 802.11b, IEEE 802.11g, and IEEE 802.11n standards defined by the Institute of Electrical and Electronic Engineers (IEEE). Wi-Fi is also widely used in shops, hotels, restaurants etc. to provide wireless Internet access.

An important aspect for most wireless communication systems is that they provide secure communications. Such security should preferably ensure that third parties cannot eavesdrop on the over the air communications, i.e. that a third party cannot receive the radio transmissions and successfully decode the data. In order to provide such protection, data transmissions over the air may be encrypted. However, in order to encrypt data, the two devices must be able to securely setup an encryption key to be used. Another factor that is important is authentication of the communication devices such that a given communication device can be certain that it communicates with the intended other communication device rather than possibly a third communication device seeking to intercept the data messages.

The Wi-Fi link between a Wi-Fi Access Point (AP) and Wi-Fi Station (STA) or the Wi-Fi link between a Wi-Fi Direct Peer-to-Peer Group Owner (GO) and Client can be cryptographically protected for confidentiality and integrity. This is specified in the Wi-Fi Protected Access (WPA) specifications (specifically in "Wi-Fi Protected Access (WPA)-Enhanced Security Implementation Based on IEEE P802.11i standard", Version 3.1, August, 2004). This standard provides two authentication methods. The first is called WPA2-Personal or WPA2-PSK (Pre-Shared Key) and provides a solution for home networks and small enterprises that have no authentication server. The second method is called WPA2-Enterprise and uses an IEEE 802.1X-authentication server.

In both systems, all keys that are required are derived from one key which is known as the Pairwise Master Key (PMK). In WPA2-PSK mode, the PMK is the same for all devices that have to communicate with one another using Wi-Fi which is protected by WPA2, and accordingly it has to be shared with all the relevant devices before WPA2 can be used. In WPA2-Enterprise, the PMK is different per pair of communicating devices and is determined in a protocol with the authentication server.

When two Wi-Fi devices set-up a Wi-Fi connection (e.g. a laptop with Wi-Fi that wants to join a Wi-Fi network has to set-up a Wi-Fi link with the Access Point of the network), they execute the so-called WPA four-way handshake in order to derive their common Pairwise Transient Key (PTK), which is the key from which all other keys protecting the specific link are derived. The PTK is derived from the PMK and some numbers that are sent in the clear over Wi-Fi during the four-way handshake. As a result any device that has followed the four-way handshake and which knows the PMK is able to compute the PTK, and thus is able to decrypt all Wi-Fi communication between the two devices. It is even possible for a Wi-Fi device to force another device to execute the four-way handshake with the AP again.

In WPA2-PSK mode, the PMK is a 256-bit value. It is difficult for humans to distribute 256-bit numbers (e.g. to read hexadecimal code on one device and enter it into another), therefore it is also possible to use a passphrase of up to 63 characters, from which the 256-bit PMK can be derived.

Although such passphrases are easier to handle for humans than random 256-bit numbers, it was still considered too cumbersome, and therefore the Wi-Fi Alliance developed a variant known as the Wi-Fi Simple Configuration (WSC) specification ("Wi-Fi Simple Configuration Technical Specification", Version 2.0.2, 2011, Wi-Fi Alliance, also known as Wi-Fi Protected Setup—WPS). In this specification, a secure method of transferring network credentials (a network credential includes a PMK, or a passphrase from which a PMK can be derived) from one device to another is defined. This method uses 8 messages, referred to as M1-M8. Depending on the variation used, whether an error occurred, etc., not all 8 messages have to be used. When two devices have agreed to use WSC, one device sends message M1 to the other, and the other device then responds with message M2, etc. If one device starts to distrust the other, it terminates the protocol. If no problems are encountered, the device not knowing the PMK at the outset will have obtained it from the other device in a secure manner.

The WSC approach for establishing the encryption key for securing the transfer of network credentials is based on the Diffie-Hellman key exchange algorithm for agreeing a common secret key. The Diffie-Hellman key exchange algorithm is well known in the encryption field and is based on each device communicating only codes that may be known by anybody and by using private codes that only the individual device knows. An attacker cannot make use of the codes that may be known by anybody if he does not know the corresponding private codes.

For example, two parties may agree on two integers, a prime number p and a base g. These numbers may be public and generally known. Each party then selects a secret integer (the first party selects a, the second party selects b) which is only known by each individual party and which is never communicated to the other party or any other device.

The first party computes the value $A=g^a \mod p$ and sends the result A to the other party. Only the calculated value A is communicated and the secret value a is not communicated. Furthermore, the function used to derive A is a so-called one-way function which is easy to use to calculate in one direction but cannot practically be inverted. Specifically, whereas it is relatively easy to calculate A when g, p and a are known it is very difficult to calculate a from A, g and p. For the particular function that is used in the Diffie-Hellman key exchange algorithm, this is known as the discrete logarithm problem.

Similarly the second party proceeds to calculate $B=g^b \mod p$ and transmit it to the first party.

The first party then proceeds to calculate the value $B^a \mod p$ and the second party proceeds to calculate the value $A^b \mod p$. Furthermore, it can be shown that $B^a \mod p = A^b \mod p$, i.e. the first and second party proceeds to calculate the same value. This value can thus be determined separately by each device based on their secret code, the value received from the other party, and some pre-agreed public values.

However, without knowledge of either a or b, i.e. without knowledge of any of the secret integers, it is very difficult to calculate the value. Although not impossible in theory it is in practice not possible to calculate the value or the secret integers provided the integers used are sufficiently large. Accordingly, it is not possible for an eavesdropping device to determine the value which is determined by both the parties. The value may therefore be used as an encryption key.

The Diffie-Hellman part of the WSC protocol is performed using the messages M1 and M2. Diffie-Hellman works such that no one listening to this exchange is able to compute the secret encryption key (the Diffie-Hellman (DH) key) that the two devices each arrived at. However, an issue with the Diffie-Hellman approach is that it does not provide device authentication, which means that each device has no information of which specific other device the encryption key has been setup with.

Message M1 contains among other things a random number (nonce) called N1 and the Diffie-Hellman public key of the device sending M1. N1 is used to protect against so-called replay attacks, whereby an attacker tries to use previously intercepted known good responses from legitimate devices to challenges. If challenges contain a random part with enough bits, it will not occur in practice that the same challenge is used more than once, so it does not make sense for attackers to memorize known good responses to challenges. Similarly, message M2 contains among other things a random number (nonce) called N2 and the Diffie-Hellman public key of the device sending M2. The random data may specifically be a nonce, or cryptographic nonce, which is a number or bit string which is used only once. This may for example be achieved by generating random numbers with sufficiently many bits, so the probability of generating two identical nonces is negligible. M2 may already contain information encrypted with the secret encryption key (the Diffie-Hellman (DH) key), The approach may be sensitive to a man-in-the-middle attack where an eavesdropping device sets up communication links with the two communicating devices and forwards messages between the devices. Such a man-in-the-middle device may setup encryption separately with each of the communicating devices and may simply use the appropriate encryption for each device. The communicating devices will not be aware that they are communicating with the other device via an intermediate as they both think that they have set up encryption directly with the other device. Thus, it is possible for a third device to perform a man-in-the-middle attack, i.e. it can execute the Diffie-Hellman part of the WSC protocol separately with both devices resulting in it agreeing one Diffie-Hellman key with one device and another Diffie-Hellman key with the other device. Since it knows both keys, it can decrypt a message from one device, read it, re-encrypt it with the other DH key and then send it to the other device. Apart from some possible message delay, the other two devices will not be able to detect the man-in-the-middle device. What is sent by one device is received by the other. However, the third device will have full visibility of the communicated data.

The WSC procedure addresses this authentication issue by using a second, 'out-of-band' channel in a variety of ways.

One such way is based on a PIN-based setup. In this setup, the user has to read a PIN number (8 decimal digits) on one device and manually enter it into the other device. The PIN may be a static PIN, e.g. printed on the first device or on a sticker or card that is provided with the first device. The PIN may also be a dynamic PIN which is e.g. shown on a display of the first device.

The messages M3-M8 of the WSC setup are used to reveal the PIN to each other, part by part, in a cryptographic secure way. If both devices are confident that the other device knows the same PIN, they will proceed to use the Diffie-Hellman key to transfer the PMK known by one of the devices to the other device in the M7 or M8 messages. When both devices have knowledge of the same PMK, they can set-up WPA2 for Wi-Fi using the four-way handshake. Thus, in the approach the M3-M8 messages are necessary to authenticate the devices and to transfer the PMK.

WSC also suggests another approach based on the use of Near Field Communication (NFC). Near field communication is a communication technique that utilizes near field magnetic coupling to transfer data, and if necessary power, between suitably enabled devices. Specifically a Near Field Communication standard has been developed by ISO/IEC (the International Organization for Standardization/International Electrotechnical Commission) and the NFC Forum (http://www.nfc-forum.org/home/) to provide a two-way communication technology, able to operate in one of two modes, either using peer-to-peer communication, which is also sometimes called NFC Peer mode, or using an asymmetric arrangement with an active master communicating with a passive tag (similar to conventional RFID techniques). The operating range is typically in the order of just a few centimeters. The Wi-Fi Simple Configuration specification describes three ways to use NFC, namely an NFC Token or NFC tag with a device PIN or device Password,
an NFC Token or NFC tag with network credentials,
NFC Peer mode for the transfer of a device PIN or device Password or network credentials.

It should be noted that the terms NFC token and NFC tag tend to be used interchangeably to refer to the same entity. The official name defined by the NFC Forum and used in their specifications for NFC is that of an NFC tag. However, the term NFC token is also frequently used and is specifically used by the Wi-Fi Alliance which is responsible for the Wi-Fi standards. In the following, the term NFC tag will be used.

Whereas an NFC-enabled device can operate in reader/writer and peer-to-peer mode (and may also operate in NFC tag emulation mode), an NFC tag is typically a passive device, which means that the tag does not need its own power source (e.g. battery) to operate, but is powered by the energy of the device that reads from it or writes to it. Some NFC tags are read only, i.e. they store data which can only be read by an NFC-enabled device. Other NFC tags may be both read from and written to by an NFC-enabled device. In the NFC tag emulation mode, an NFC tag has, besides its NFC wireless interface, also an electrical interface which can be used be to read and write data to the NFC tag. In this way, the NFC tag will appear as e.g. a passive NFC tag to an external device interfacing with it over the NFC air interface, but the wired interface allows e.g. the NFC tag to be adapted and dynamically configured, or be used in two-way communication between the processor that is connected to its wired interface and the external device interfacing with it over the NFC air interface. The terms 'NFC tag', passive NFC tag and 'tag' are used interchangeably herein.

In the following the authentication procedures using NFC communication is described in more detail. For brevity and clarity, the term pairing secret will be used to refer to information that is intended not to be known by an attacking device, and in particular to refer to a device PIN, a device password, a PMK, or a network credential.

An 8-digit PIN is simpler for the user to handle than a 63-character passphrase. However, WSC offers an even simpler way for the user to transfer the PIN, namely with a so-called Password Token. A Password Token is an NFC tag in which the device PIN is stored (unencrypted). Although the WSC specification calls this a device password, it functions as a device PIN in the WSC protocol. NFC devices (e.g. an NFC reader reading an NFC tag) need to be within typically a couple of centimeters for reliable communication. This provides the advantage that a user can have a very high degree of certainty that if he brings two NFC devices close together, the NFC information that is read by one of these devices will have originated in the other device.

The WSC specification also specifies how to use NFC for the direct transfer of the (unencrypted) PMK, namely as part of the so-called network Credentials in a so-called Configuration Token.

An NFC Token or NFC tag can be built in the housing of a device or it can be integrated in a credit card sized card. Devices equipped with an NFC reader can read such NFC tags wirelessly using NFC read operations. Devices equipped with an NFC writer can write such NFC tags wirelessly using NFC or through wired connections.

NFC also specifies a so-called NFC peer mode of operation wherein two NFC devices communicate directly with each other using NFC but without using an NFC tag. The WSC specification allows for NFC Peer mode to also be used for the transfer of the device PIN, device Password and network Credentials, using the same formatting of the messages as used in an NFC tag, which means that the device PIN, device Password and network Credentials are not encrypted during these transfers.

Using NFC to set-up a secure Wi-Fi link is very easy for the user. In case of a separate NFC tag, the user simply touches (the NFC reader location of) a device with the NFC tag of the other device. In case of an integrated NFC tag, or in case of NFC Peer mode, the user touches (the NFC reader location of) a device with the other device (e.g. a smart phone with built-in NFC).

However, it has been found that the current NFC authentication operation does not provide optimal security. For example, if other devices can detect the authentication/security data, they may be able to get access to Wi-Fi networks or devices that they are not allowed to have access to.

For example, the device PIN or device Password is used to authenticate two Wi-Fi devices for each other as explained above. Only the two involved devices should know the device PIN or Password. However, if another device, e.g. a man-in-the-middle attacker, is able to determine the device PIN or device Password, it can use this to setup separate communications with the two devices. Specifically, the third device can use the information to establish a trust relationship with both of the original devices by exchanging messages M3-M8 with each of the devices. Thus, both devices will consider the third device as the authenticated other device and remain unaware that they are communicating through a man-in-the-middle-device.

In the Pre-Shared Key mode, the keys are derived in such a way that any device which knows the PMK, and which follows the WPA four-way handshake in which the key between two devices is determined, can independently determine the key. Therefore, if the network credentials are known, a third device can from then on decrypt all traffic on the Wi-Fi network that uses those credentials in PSK mode (the network credentials contain a passphrase or a bit string from which the PMK can be computed using a non-secret procedure.) Indeed if the third device missed the four-way handshake, it is even possible for this device to force another device to execute the four-way handshake with the third device again.

The authentication approaches using out of band communication in the form of NFC communications are based on NFC communication being considered to be secure due to the very restricted distances of NFC communication links. However, such systems may have a weakness in being dependent on these assumptions about the NFC communication link and may in some scenarios not provide optimal security. Although the very limited range of NFC communications provides some protection against other devices being able to obtain the secret information, it cannot be fully guaranteed that this will never happen. Indeed, recent research has indicated that NFC communications can be detected and decoded at substantial distances (indeed at distances of up to several meters).

Hence, an improved approach would be advantageous and in particular an approach allowing increased flexibility, user friendliness, improved security and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of operation for a wireless communication system comprising a first communication unit and a second communication unit, the method comprising: the first communication unit transmitting second public key identification data to the second communication unit using NFC communication, the second public key identification data being indicative of a public key of the first communication unit; the first communication unit transmitting public key identification data indicative of the public key of the first communication unit to a first Wi-Fi communication unit using Wi-Fi communication; the second communication unit receiving the second public key identification data from the first communication unit using NFC communication; the second communication unit receiving fourth public key identification data from a second Wi-Fi communication unit using Wi-Fi communication; the second communication unit generating a second match indication indicative of whether the second public key identification data matches the fourth public key identification data; the second communication unit terminating Wi-Fi communication with the second Wi-Fi communication unit if the second match indication is indicative of the second public key identification data not matching the fourth public key identification data and otherwise performing the steps of: generating the public key of the first communication unit in response to at least one of the second public key identification data and the fourth public key identification data, generating a second session key from the public key of the first communication unit and a private key of the second communication unit, generating a second network key, generating a second encrypted network key by encrypting the second network key using the second session key, and transmitting the second encrypted network key and public key identification data indicative of a public key of the second communication unit to the second Wi-Fi communication unit; the second communication unit transmitting first public key identification data to the first communication unit using NFC communication, the first public key identification data being indicative of a public key of the second communication unit; the first communication unit receiving the first public key identification data from the second communication unit using Near Field Communication, NFC, communication; the first communication unit receiving third public key identification data and a first encrypted network key from a first Wi-Fi communication unit using Wi-Fi communication; the first communication unit generating a first match indication indicative of whether the first public key identification data matches the third public key identification data; the first communication unit terminating Wi-Fi communication with the first Wi-Fi communication unit if the first match indication is indicative of the first public key identification data not matching the third public key identification data and otherwise performing the steps of: generating the public key of the second communication unit in response to at least one of the first public key identification data and the third public key identification data; generating a first session key from the public key of the second communication unit and a private key of the first communication unit; generating a first network key by decrypting the first encrypted network key using the first session key; and communicating with the first Wi-Fi communication unit using the first network key.

According to an aspect of the invention there is provided a wireless communication system comprising a first communication unit and a second communication unit, the first communication unit comprising: a first NFC receiver for receiving first public key identification data from the second communication unit using Near Field Communication, NFC, communication; a first NFC transmitter for transmitting second public key identification data to the second communication unit using NFC communication, the second public key identification data being indicative of a public key of the first communication unit; a first communication controller for performing Wi-Fi communication with a first Wi-Fi communication unit, the first communication controller being arranged to transmit public key identification data indicative of the public key of the first communication unit to the first Wi-Fi communication unit and to receive third public key identification data and a first encrypted network key from the first Wi-Fi communication unit; first comparator for generating a first match indication indicative of whether the first public key identification data matches the third public key identification data; wherein the first communication controller is arranged to terminate the Wi-Fi communication with the first Wi-Fi communication unit if the first match indication is indicative of the first public key identification data not matching the third public key identification data and to otherwise: generate the public key of the second communication unit in response to at least one of the first public key identification data and the third public key identification data, generate a first session key from the public key of the second communication unit and a private key of the first communication unit, generate a first network key by decrypting the first encrypted network key using the first session key, and to communicate with the first Wi-Fi communication unit using the first network key; and the second communication unit comprising: a second NFC receiver for receiving the second public key identification data from the first communication unit using NFC communication; a second NFC transmitter for transmitting the first public key identification data to the first communication unit using NFC communication, the first public key identification data being indicative of a public key of the second communication unit; a second communication controller for performing Wi-Fi communication with a second Wi-Fi communication unit, the second communication controller being arranged to transmit public key identification data indicative of the public key of the second communication unit to the second Wi-Fi communication unit and to receive fourth public key identification data from the second Wi-Fi communication unit; a second comparator for generating a second match indication indicative of whether the second public key identification data matches the fourth public key identification data; a wherein the second communication controller is arranged to terminate the Wi-Fi communication with the second Wi-Fi communication unit if the second match indication is indicative of the second public key identification data not matching the fourth public key identification data and to otherwise: generate the public key of the first communication unit in response to at least one of the second public key identification data and the fourth public key identification data, generate a second session key from the public key of the first communication unit and a private key of the second communication unit, generate a second network key; generate a second encrypted network key by encrypting the second network key using the second session key, and to transmit the second encrypted network key and public key identification data indicative of a public key of the second communication unit to the second Wi-Fi communication unit.

The invention may provide a more secure communication in a wireless communication system that uses Wi-Fi communication. An improved authentication of communication units may be achieved. In particular, in many embodiments, the approach may provide a low complexity yet efficient and secure authentication of devices. In particular, a high degree of certainty can be achieved that each communication unit is communicating with the expected other communication unit. Thus, an increased certainty can be provided to the user that the communication is with the intended recipient. The approach may provide increased resistance to e.g. man-in-the middle attacks.

Increased reliability of authentication may be achieved by using two types of communication links and specifically by utilizing NFC to authenticate devices for a Wi-Fi communication. This may ensure that close proximity is required for authentication. The approach may provide improved resilience and reduced sensibility to e.g. man-in-the-middle attacks. The approach may in particular in many scenarios provide improved resilience to attacks from third parties that may be able to detect and receive the NFC communications.

In particular, the approach may provide a high degree of certainty that the Wi-Fi communication is performed by the intended two communication units. Specifically, the approach provides a high degree of certainty that the Wi-Fi communication is between the same devices that were involved in the NFC data exchange. Specifically, the short range of the NFC communication allows the user to physically control the exchange of the public key identification data, i.e. the user may ensure that the first public key identification data is exchanged between the two communication units that are intended to be in communication with each other (the first and second communication units). The approach then allows the NFC exchange to be used to ensure that the Wi-Fi communication is between the correct communication units. Specifically, the approach allows e.g. the first communication unit to determine with a very high probability that the Wi-Fi communication is initiated with the intended communication unit as the Wi-Fi communication is terminated unless the Wi-Fi communication can provide the same public key as that transmitted to it via NFC. Thus, a user can ensure that Wi-Fi communication is with a communication unit that has been identified by bringing the NFC transmitter providing the public key identification data sufficiently close to allow it to transmit over the very short NFC range.

Specifically, the approach may use low complexity operations allowing a user to ensure that two-way Wi-Fi communication and NFC communication are between the same communication units, thereby allowing the short range NFC characteristics to ensure that the Wi-Fi communication is between the communication units intended by the user. In particular, if the first match indication is indicative of a match, it can be ensured that the first Wi-Fi communication unit is indeed one associated with the second communication unit (and specifically it may be the second communication controller). Similarly, if the second match indication is indicative of a match, it can be ensured that the second Wi-Fi communication unit is indeed one associated with the first communication unit (and specifically it may be the first communication processor).

Furthermore, rather than utilizing a conventional NFC based authentication, the approach requires the communication units to provide full two-way authentication using NFC communications. Thus, both communication units support transmission of public key identification data over both NFC and Wi-Fi communication links, and thus any communication unit can ensure that it will terminate a Wi-Fi communication unless the NFC transmitter of the other communication unit is at some point sufficiently close to allow it to transmit public key identification data over NFC. Hence, an attacking communication unit will not be able to pursue a Wi-Fi communication unit merely by being able to receive NFC communications from another communication unit. This allows improved security compared to conventional one-way authentications wherein NFC authentication is communicated uni-directionally. Specifically, even if an attacking device is able to receive NFC transmissions from one of the first or second communication units, it will not be able to utilize this information for a man in the middle attack, since the attacker does not possess the corresponding private keys. Rather, Wi-Fi communication will only be setup for devices for which the NFC communication in both directions is possible, i.e. where both communication units can both receive and transmit over the NFC link.

In contrast to conventional belief, the Inventor has realized that improved security is obtained by using a two-way NFC based authentication rather than a one way authentication. Indeed, for existing systems employing NFC for authentication, it has been considered that a single NFC communication provides a fully secure system. However, the Inventor has realized that situations may occur wherein such an approach may in some scenarios result in suboptimal operation, and that improved security can be achieved by using a two-way authentication using multiple NFC data exchanges.

In particular, the approach may provide improved security and may allow a communication system which does not require NFC communications to be private or undetectable in order for the authentication to be fully secure. Indeed, in many embodiments, the NFC transmissions may be fully public while still providing secure operation, and in particular a high certainty that the Wi-Fi communication is indeed performed between the intended communication units.

Specifically, in comparison to e.g. the current WSC approach, it is possible to achieve not only a more secure operation than the conventional approach of combining NFC and Wi-Fi Simple Configuration but also a more efficient operation can be achieved. Indeed, it is possible to omit the six messages M3-M8, which are exchanged between the two devices over Wi-Fi in the course of executing the traditional WSC protocol in order to check whether both devices have knowledge of the same device PIN and to transfer the network key (e.g. PMK). Instead, the described approach may allow the network key to be transferred using (a variant of) the M2 message where the network key can be encrypted with a key (derived from) the Diffie-Hellman (DH) key.

The approach may allow authentication of Wi-Fi communications in both directions based on NFC transmissions, and in particular may allow authentication of both the communication unit which initiates the communication setup as well as the responding communication unit. For example, the first communication unit may initiate the setting up of a new communication where the initiation comprises transmitting the third public key identification data to the second communication unit. The second communication unit terminates the communication setup unless it has received corresponding public key identification data over NFC. However, although the communication setup has been initiated by the first communication unit, this unit will also terminate the communication setup unless it receives matching public key identification data over both Wi-Fi and NFC. Furthermore, the process allows for a very efficient establishment of a network key that will be used for protecting communication only if both of the communication units are authenticated by public key identification data received over NFC.

The approach thus allows a very secure communication establishment with a high certainty that the communication is indeed between the desired communication units and using a network key that cannot be determined from the messages exchanged over Wi-Fi and NFC between the two desired communication units by communication units other than the two desired communication units.

The first communication unit specifically communicates with a first Wi-Fi communication unit which it seeks to ensure is indeed the second communication unit. However, initially it is uncertain whether the first Wi-Fi communication unit is indeed the second communication unit or not. Thus, in some scenarios, the first Wi-Fi communication unit may be the second communication unit. However, in other scenarios the first Wi-Fi communication unit may be an attacking Wi-Fi communication unit pretending to be the second communication unit.

Similarly, the second communication unit specifically communicates with a second Wi-Fi communication unit which it seeks to ensure is indeed the first communication unit. However, initially it is uncertain whether the second Wi-Fi communication unit is indeed the first communication unit or not. Thus, in some scenarios, the second Wi-Fi communication unit may be the first communication unit. However, in other scenarios the second Wi-Fi communication unit may be an attacking Wi-Fi communication unit pretending to be the first communication unit.

The first Wi-Fi communication unit is thus a communication unit which may or may not be the same as the second communication unit in different scenarios. Similarly, the second Wi-Fi communication unit is a communication unit which may or may not be the same as the first communication unit in different scenarios.

In the scenario wherein the first Wi-Fi communication unit is indeed the second communication unit, the third public key identification data is the public key identification data indicative of the public key of the second communication unit transmitted to the first communication unit from the first Wi-Fi communication unit (i.e. from the second communication unit in this case). As this will match the first public key identification data received by NFC a positive first match indication should result. Furthermore, in this case, the second encrypted network key which is transmitted from the second communication unit is the same as the first encrypted network key received by the first communication unit. In this case, the first communication unit generates the same session key as the second communication unit, i.e. the first and second session keys are identical. Accordingly, the first communication unit is able to decrypt the first encrypted network key with the first session key to generate the first network key, which will be identical to the second network key.

In the scenario where the second Wi-Fi communication unit is indeed the first communication unit, the fourth public key identification data is the public key identification data indicative of the public key of the first communication unit which is transmitted to the second communication unit from the second Wi-Fi communication unit (i.e. from the first communication unit in this case). As this will match the second public key identification data received by NFC, a positive second match indication should result. In this case, the second communication unit will be arranged to generate a session key from the received public key identification data and encrypt the second network key using the session key to generate the second encrypted network key. This is transmitted to the second Wi-Fi communication unit/first communication unit, and thus the first and second encrypted network keys are the same. However, as the first communication unit can decrypt the key, the first communication unit can generate the same network key as the second communication unit, i.e. the first and second network keys are identical. Accordingly, the first communication unit is able to decrypt the first encrypted network key to generate the first network key, (which as mentioned will be identical to the second network key). However, it will only do so if the public key identification data received over NFC and Wi-Fi match, i.e. only if the encrypted network key is received from the second communication unit.

Thus, when the first Wi-Fi communication unit is indeed the second communication unit and the second Wi-Fi communication unit is indeed the first communication unit, then the first public key identification data will match the third public key identification data, the second public key identification data will match the fourth public key identification data, the third public key identification data will be the public key identification data indicative of the public key of the second communication unit transmitted from the first Wi-Fi communication unit to the first communication unit, the fourth public key identification data will be the public key identification data indicative of the public key of the first communication unit transmitted from the second Wi-Fi communication unit to the second communication unit, the first encrypted key is the second encrypted key, the first session key is the same as the second session key, and the first network key and the second network keys are the same. If the first communication unit is not the second Wi-Fi communication unit or the second communication unit is not the first Wi-Fi communication unit, this will not be the case.

The first match indication may be a binary indication which indicates whether the first public key identification data matches the third public key identification data or not in accordance with a match criterion. Similarly, the second match indication may be a binary indication which indicates whether the second public key identification data matches the fourth public key identification data or not in accordance with a match criterion.

The public key identification data may be considered to match if they are indicative of the same public key. Specifically, the first public key identification data and the third public key identification data may be considered to match if they are identical or identify at least one identical public key. In some embodiments one or more of the public key identification data may allow the corresponding public key to be uniquely determined from the public key identification data, e.g. the public key identification data may directly represent the public key in a suitable representation. In some embodiments, one or more of the public key identification data may provide information that allows the communication unit to determine the corresponding public key, e.g. it may contain address data that allows the communication unit to retrieve the public key from a local or remote store or list of public keys. In some embodiments, one or more of the public key identification data may comprise a non-unique representation of the public key, i.e. the public key identification data may correspond to a plurality of possible public keys. In such embodiments, a match may be considered to exist if any matching public keys can be found from the possible public keys. As a specific example, one or more of the public key identification data may comprise a hash of the corresponding public key.

Public key identification data may specifically be any data which can be used in determining the public key for the corresponding communication unit. Specifically, the public key identification data for a communication unit may comprise or consist in the public key for the communication unit, a hash for the public key for the communication unit, or an identity indication for the communication unit. In the first case, the communication unit receiving the public key identification data may simply determine the public key as the provided data. In the two latter cases, the communication unit may determine the public key by a table look-up in a table storing associated values of public keys and associated hashes or communication unit identities.

Near field communication is a communication technique that utilizes near field magnetic coupling to transfer data. A near field communication link may typically have a range for data communication of a maximum of 20, 10 or even 5 cm. The NFC communication may specifically by in accordance with the NFC standard defined by the NFC Forum.

The Wi-Fi communication may be a communication that complies with the family of Wi-Fi communication standards such as e.g. one of the IEEE 802.11a, IEEE 802.11b, IEEE 802.11g, IEEE 802.11n, IEEE 802.11ac and IEEE 802.11ad standards. The Wi-Fi communication link may specifically support an IEEE 802.11 standards based communication.

Specifically, Wi-Fi communication may be a wireless communication in the 2.4 GHz, 5 GHz and 60 GHz spectral band substantively based on one or more of the IEEE 802.11 family of standards, the Wi-Fi Alliance standards and certification programs, and the Wireless Gigabit Alliance standards and certification programs.

The first or second communication processor may specifically terminate a Wi-Fi communication setup if the corresponding match indication is indicative of the corresponding public key identification data not matching.

The first NFC transmitter may be contained with other features of the first communication unit, or may in some embodiments be separate. For example, the first NFC transmitter may be implemented as a passive NFC tag which may be separate from other functionality of the first communication unit. Similarly, the second NFC transmitter may be contained with other features of the second communication unit, or may in some embodiments be separate. For example, the second NFC transmitter may be implemented as a passive NFC tag which may be separate from other functionality of the second communication unit.

In accordance with some embodiments of the invention at least one of the first public key identification data and the third public key identification data comprises the public key of the second communication unit.

This may provide improved operation in many embodiments and may in particular allow a facilitated determination of the public key.

Similarly, at least one of the second public key identification data and the fourth public key identification data may comprise the public key of the second communication unit.

In accordance with some embodiments of the invention, at least one of the first public key identification data and the third public key identification data comprises a hash of the public key of the second communication unit.

This may provide improved operation in many embodiments and may in particular allow a facilitated and lower resource communication. The use of a hash may also provide additional security.

In some embodiments, at least one of the second public key identification data and the fourth public key identification data comprises a hash of the public key of the first communication unit.

In accordance with some embodiments of the invention, the first comparator is arranged to determine a first key from the first public key identification data and a second key from the third public key identification data, and to generate the first match indication in response to a comparison of the first key and the second key.

This may provide improved operation in many embodiments. In particular, it may allow an accurate determination of whether the first and third public key identification data corresponds to the same public key. The first key may be a first public key candidate for the public key of the second communication unit and the second key may be a second public key candidate for the public key of the second communication unit. If the first and second public key candidates are identical they may be used by the first communication unit as the public key of the second communication unit.

In some embodiments, the second comparator is arranged to determine a third key from the second public key identification data and a fourth key from the fourth public key identification data, and to generate the second match indication in response to a comparison of the third key and the fourth key.

This may provide improved operation in many embodiments. In particular, it may allow an accurate determination of whether the first and third public key identification data corresponds to the same public key.

In accordance with some embodiments of the invention, the first public key identification data comprises a first hash of the public key of the second communication unit; and the first match indicator is arranged to determine the public key of the second communication unit from the third public key identification data; to generate a second hash from the generated public key of the second communication unit; and to generate the first match indication in response to a comparison of the first hash and the second hash.

This may provide improved operation in many embodiments. In particular, it may allow an accurate determination of whether the first and third public key identification data corresponds to the same public key.

In some embodiments, the second public key identification data comprises a third hash of the public key of the first communication unit; and the second match indicator is arranged to determine the public key of the first communication unit from the fourth public key identification data; to generate a fourth hash from the generated public key of the first communication unit; and to generate the second match indication in response to a comparison of the third hash and the fourth hash.

In accordance with an optional feature of the invention, the second communication unit is further arranged to transmit Wi-Fi configuration data to the first communication unit by NFC communication, and the first communication controller is arranged to adapt the Wi-Fi communication in response to the Wi-Fi configuration data.

This may provide facilitated or e.g. faster configuration and setup of the Wi-Fi communication. Typically, the Wi-Fi configuration setup data may be public data which may be overheard by any communication unit.

The Wi-Fi configuration data may specifically be Wi-Fi configuration setup data, and the communication processor may specifically be arranged to setup the Wi-Fi communication in response to the Wi-Fi configuration setup data.

The Wi-Fi configuration data may specifically include data defining mandatory or optional link parameters, the channel to use, public network parameters, Group Owner information etc.

In accordance with an optional feature of the invention, the first communication unit is arranged to transmit secret data to the second communication unit only if the first match indication is indicative of the first public key identification data matching the third public key identification data.

The approach may allow that secret data is not communicated until it can be assured that the communication is indeed between the intended communication units. As such, it may ensure that secret information is not provided to unintended parties. Secret data may include all data for which the distribution is controlled. Specifically, secret data may be non-public data.

The first communication unit may accordingly not transmit data to the first Wi-Fi communication unit until it has been determined that this is indeed associated with the same public keys as the second communication unit. The secret data may specifically include a Pre-Shared Key (PSK), a network key or a Pairwise Master Key (PMK), or a device key or device PIN code.

In accordance with an optional feature of the invention, the second communication unit is arranged to transmit secret data to the first communication unit only if the second match indication is indicative of the second public key identification data matching the fourth public key identification data.

The approach may allow that secret data is not communicated until it can be assured that the communication is indeed between the intended communication units. As such, it may ensure that secret information is not provided to unintended parties. Secret data may include all data for which the distribution is controlled. Specifically, secret data may be non-public data.

The second communication unit may accordingly not transmit data to the second Wi-Fi communication unit until it has been determined that this is indeed associated with the same public keys as the second communication unit. The secret data may specifically include a Pre-Shared Key (PSK), a network key or a Pairwise Master Key (PMK), or a device key or device PIN code.

In accordance with an optional feature of the invention, the first communication unit is arranged to transmit the secret data to the second communication unit via a Wi-Fi communication link.

This may provide improved and/or facilitated operation in many embodiments. The communication of the secret data may for example be in any of the messages M2-M8 of the Wi-Fi Simple Configuration setup.

In accordance with an optional feature of the invention, the NFC communication is performed using an NFC peer-to-peer communication link between the first communication unit and the second communication unit.

This may allow easier implementation and/or operation in many embodiments.

In accordance with an optional feature of the invention, the second communication unit is arranged to transfer the first public key identification data to an NFC tag; and the first NFC receiver is arranged to read the first public key identification data from the NFC tag by an NFC read operation.

This may in many embodiments provide an improved user experience and/or facilitate implementation.

In accordance with an optional feature of the invention, the first communication unit is arranged to transfer the second public key identification data to an NFC tag; and the second NFC receiver is arranged to read the second public key identification data from the NFC tag by an NFC read operation.

This may in many embodiments provide an improved user experience and/or facilitate implementation.

In accordance with an optional feature of the invention, the first communication unit is arranged to transmit an authentication failure message to the second communication unit in response to a detection that the first match indication is indicative of the first public key identification data not matching the third public key identification data.

This may provide an improved user experience and/or more secure communication.

In accordance with an optional feature of the invention, the second communication unit is arranged to transmit an authentication failure message to the first communication unit in response to a detection that the second match indication is indicative of the second public key identification data not matching the fourth public key identification data.

This may provide an improved user experience and/or more secure communication.

In accordance with an optional feature of the invention, the first communication unit and the second communication unit are arranged to initiate a communication setup in accordance with the Wi-Fi Simple Configuration specification.

The invention may in particular allow improved performance for a wireless communication system supporting Wi-Fi Simple Configuration communication setups. An improved security and/or efficiency can be achieved. The Wi-Fi Simple Configuration specification may e.g. be the Wi-Fi Simple Configuration Technical Specification, Version 2.0.2, © 2011 Wi-Fi Alliance.

According to an aspect of the invention there is provided a communication unit for wireless communication system, the communication unit comprising: an NFC receiver for receiving first public key identification data from another communication unit using Near Field Communication, NFC, communication; an NFC transmitter for transmitting second public key identification data to the other communication unit using NFC communication, the second public key identification data being indicative of a public key of the communication unit; a communication controller for performing Wi-Fi communication with a Wi-Fi communication unit, the communication controller being arranged to transmit public key identification data indicative of the public key of the communication unit to the Wi-Fi communication unit and to receive third public key identification data and an encrypted network key from the Wi-Fi communication unit; a comparator for generating a first indication indicative of whether the first public key identification data matches the third public key identification data; wherein the communication controller is arranged to terminate the Wi-Fi communication with the Wi-Fi communication unit if the match indication is indicative of the first public key identification data not matching the third public key identification data and to otherwise: generate the public key of the other communication unit in response to at least one of the first public key identification data and the third public key identification data, generate a session key from the public key of the other communication unit and a private key of the communication unit, generate a network key by decrypting the encrypted network key using the session key, and to communicate with the first Wi-Fi communication unit using the network key.

According to an aspect of the invention there is provided a communication unit for wireless communication system, the communication unit comprising: an NFC receiver for receiving first public key identification data from another communication unit using NFC communication; an NFC transmitter for transmitting second public key identification data to other communication unit using NFC communication, the second public key identification data being indicative of a public key of the communication unit; a communication controller for performing Wi-Fi communication with a Wi-Fi communication unit, the communication controller being arranged to transmit public key identification data indicative of the public key of the communication unit to the Wi-Fi communication unit and to receive third public key identification data from the Wi-Fi communication unit; a comparator for generating a match indication indicative of whether the first public key identification data matches the third public key identification data; wherein the communication controller is arranged to terminate the Wi-Fi communication with the Wi-Fi communication unit if the match indication is indicative of the first public key identification data not matching the third public key identification data and to otherwise: generate the public key of the other communication unit in response to at least one of the first public key identification data and the third public key identification data, generate a session key from the public key of the other communication unit and a private key of the communication unit, generate a network key, generate an encrypted network key by encrypting the network key using the session key, and to transmit the encrypted network key and public key identification data indicative of a public key of the communication unit to the Wi-Fi communication unit.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
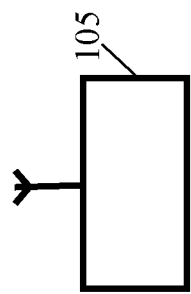
FIG. 1 illustrates an example of a wireless communication system in accordance with some embodiments of the invention.
Figure 1:
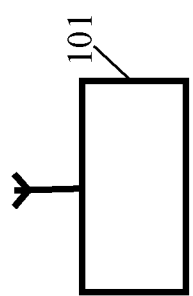
Figure 1:
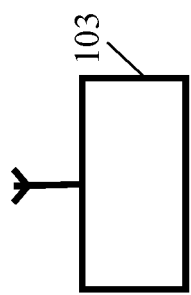

FIG. 1 illustrates an example of a wireless communication system in accordance with some embodiments of the invention.

The wireless communication system comprises a first communication unit 101 and a second communication unit 103 which seek to communicate data securely and privately. The data communication between the first communication unit 101 and the second communication unit 103 is performed via a Wi-Fi communication link. For example, the first communication unit 101 or the second communication unit 103 may be a Wi-Fi access point and the other unit may be a mobile communication unit supported by the access point. Each of the first communication unit 101 and the second communication unit 103 may be e.g. a Wi-Fi AP and a Wi-Fi Non-AP Station, Wi-Fi AP and a Wi-Fi Registrar, or two Wi-Fi P2P devices.

The Wi-Fi communication link may be a communication link that complies with the family of Wi-Fi communication standards such as e.g. one of the IEEE 802.11a, IEEE 802.11b, IEEE 802.11g, IEEE 802.11n, IEEE 802.11ac and IEEE 802.11 ad standards. The Wi-Fi communication link may specifically support an IEEE 802.11 standards based communication.

Specifically, Wi-Fi communication may be a wireless communication in the 2.4 GHz, 5 GHz and 60 GHz spectral band substantively based on one or more of the IEEE 802.11 family of standards, the Wi-Fi Alliance standards and certification programs, and the Wireless Gigabit Alliance standards and certification programs.

The Wi-Fi Alliance creates certification programs for (parts of) the IEEE 802.11 family of standards. The Wi-Fi Alliance may create certification programs for (parts of) the Wireless Gigabit Alliance standards. The Wi-Fi Alliance also creates standards for Wi-Fi communication themselves, such as e.g. the Wi-Fi Simple Configuration standard for the simple setup of a Wi-Fi communication link.

It is desired that the Wi-Fi communication is secure such that the data exchanged by the first communication unit 101 and second communication unit 103 cannot be decoded by any other device. Specifically, the system of FIG. 1 may include a third communication unit 105 which is an eavesdropping device seeking to obtain information of the exchanged data. The system of FIG. 1 seeks to prevent the third communication unit 105 from being able to successfully decode the Wi-Fi data communication. This includes providing robustness against man-in-the middle attacks from the third communication unit 105.

Figure 2:
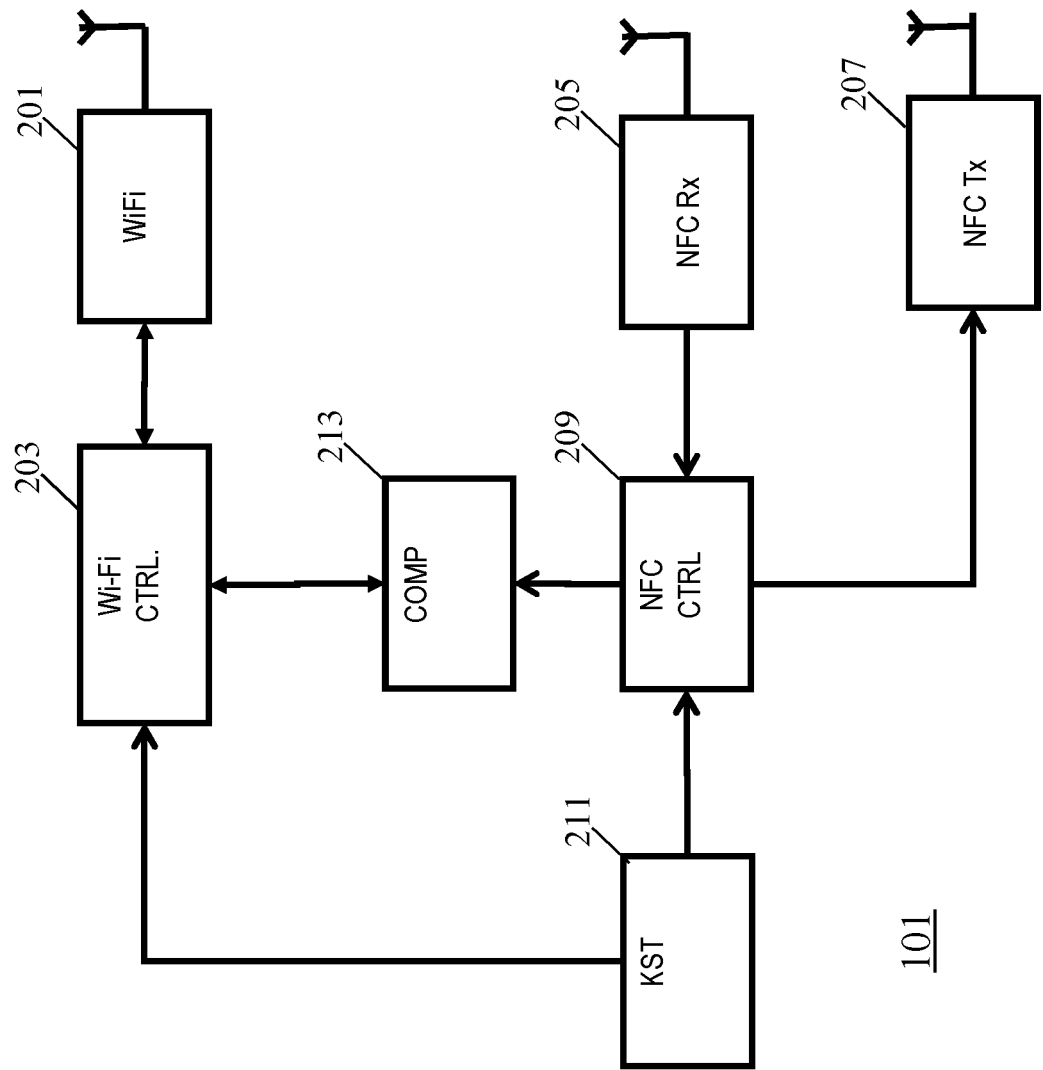
FIG. 2 illustrates an example of elements of a communication unit for a wireless communication system in accordance with some embodiments of the invention.
Figure 3:
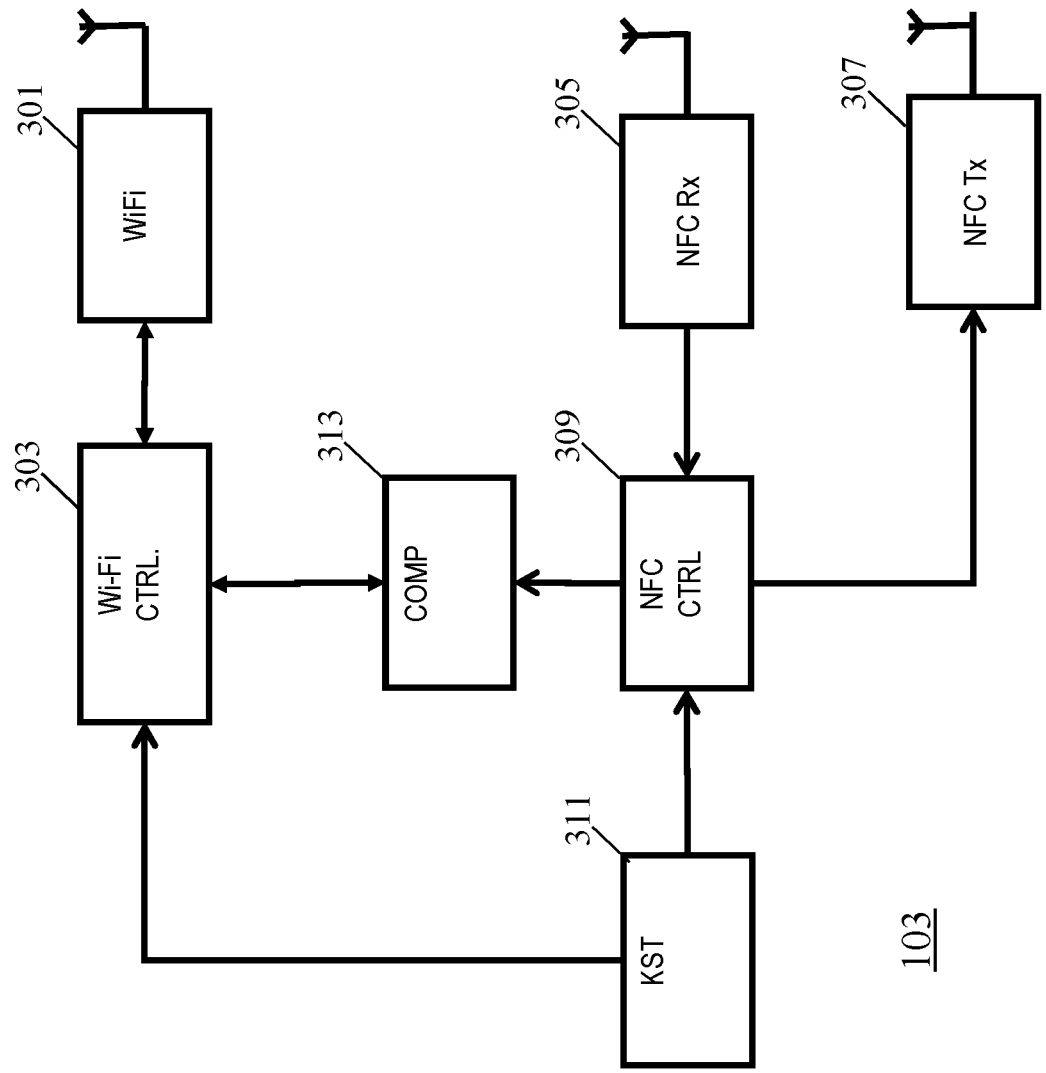
FIG. 3 illustrates an example of elements of a communication unit for a wireless communication system in accordance with some embodiments of the invention.

FIG. 2 illustrates elements of the first communication unit 101 and FIG. 3 illustrates elements of the second communication unit 103. In the example, the two communication units 101, 103 comprise substantially the same functionality as will be described in the following. Entities of the first communication unit 101 will be described using the prefix "first" and entities of the second communication unit 103 will be referenced using the prefix "second".

The first communication unit 101 comprises a first Wi-Fi transceiver 201 which is capable of receiving and transmitting data over the air interface in accordance with the Wi-Fi standards. The first Wi-Fi transceiver 201 is coupled to a first communication controller 203 which is arranged to generate, receive and process the data communicated over a Wi-Fi air interface. Specifically, the first communication controller 203 may process user data for transmission, and may decode received data for outputting. The received and decoded data may be output to external or internal functionality dependent on the specifics of the individual embodiment and user application.

Similarly, the second communication unit 103 comprises a second Wi-Fi transceiver 301 which is capable of receiving and transmitting data over the air interface in accordance with the Wi-Fi standards. Also, similarly to the first communication unit 101, the second Wi-Fi transceiver 301 is coupled to a second communication controller 303 which is arranged to generate, receive and process the data communicated over a Wi-Fi air interface. Specifically, the second communication controller 303 may process user data for transmission and may decode the received data for outputting.

In order to provide secure and secret communications, the first communication unit 101 and the second communication unit 103 may use encryption for at least some of the exchanged data. Specifically, the communication controllers 203, 303 may comprise functionality for encrypting data that is transmitted and decrypting data that is received over the Wi-Fi communication link. The communication controllers 203, 303 may alternatively or additionally comprise functionality for adding integrity protection, e.g. a cryptographic hash, to data that is transmitted and for checking the integrity of data that is received over the Wi-Fi communication link.

In order for such encryption and decryption and integrity protection to be performed at the two communication units 101, 103, a key needs to be agreed between the communication units 101, 103. Typically, a separate key is generated for each new communication setup and the key will be referenced as the network key. The authentication of the first communication unit 101 and the second communication unit 103 may be part of an initialization of a communication setup.

Separate keys may be derived from the network key for encryption and for integrity protection. It will be appreciated that in some embodiments, a network key may be re-used for more than one communication setup.

In the system of FIG. 1 the network key used for a given Wi-Fi communication setup is encrypted on the basis of public key information that has been exchanged between the two communication units 101, 103 using Wi-Fi communication. Specifically, the first communication unit 101 and the second communication unit 103 are arranged to perform a Diffie-Hellman key exchange algorithm using Wi-Fi communication in order to generate a key, which will henceforth be referred to as the session master key. From this session master key, further session keys can then possibly be determined. The session master key or session key is used by one of the communication units to encrypt the network key and send it to the other communication unit. In some embodiments, the session key may be generated directly as the session master key. It will be appreciated that in other embodiments, other key exchange algorithms may be used. It will also be appreciated that in other embodiments, a key that is derived from the session master key may be used to protect the integrity of the (encrypted) network key, e.g. by providing a cryptographic hash over the (encrypted) network key. It will also be appreciated that in some embodiments, the Diffie-Hellman (or similar) key exchange algorithm may be performed using NFC communication.

The communication units 101, 103 may use the network key to encrypt data and/or to provide integrity protection of data which is communicated over a Wi-Fi connection between the two communication units 101, 103.

However, before user data communication is commenced, the first communication unit 101 and the second communication unit 103 perform authentication to ensure that the Wi-Fi communication is indeed performed with the expected other communication unit.

In the described system, this authentication includes communication over two NFC (Near Field Communication) communication links, namely one from the first communication unit 101 to the second communication unit 103 and one from the second communication unit 103 to the first communication unit 101 (or equivalently a bidirectional communication link).

In the system, the second communication unit 103 transmits first public key identification data to the first communication unit 101 which is indicative of the public key of the second communication unit, henceforth referred to as the second public key. Similarly, the first communication unit 101 transmits second public key identification data to the second communication unit 103 which is indicative of the public key of the first communication unit 101, henceforth referred to as the first public key. Thus, both communication units receive an identification of the public key from the other communication unit over an NFC short range communication. A public key received over NFC can be trusted to have been transmitted by a transmitter that has been very close to the NFC receiver, and typically substantially less than ten centimeters. Accordingly, a user can ensure that the public key received via NFC represents the intended other party.

In addition, in the system, the communication units are arranged to setup Wi-Fi communication and this setup includes each of the communication units providing public key identification data to the other communication unit. Thus, each of the communication units receives public key identification data over the Wi-Fi communication as part of the setup.

In order to authenticate that the Wi-Fi communication is indeed with the correct other party, each of the communication units is arranged to compare whether the public key identification data received over respectively Wi-Fi and NFC correspond to matching public keys. Specifically, each of the communication units can compare whether the public key represented by the public key identification data received over Wi-Fi is indeed the same as the public key represented by the public key identification data received over NFC. If so, the remote Wi-Fi communication indeed corresponds to that of the NFC communication and it can accordingly be considered to be authenticated. The communication unit may accordingly proceed to setup the Wi-Fi communication. If not, the Wi-Fi communication may not be with the intended other party but may potentially be with an attacking communication unit, e.g. attempting a man in the middle attack. Thus, if the public key indicated by the public key identification data received over Wi-Fi differs from that indicated by the public key identification data received by NFC communication, the communication unit proceeds to terminate the Wi-Fi communication.

In the system, both communication units are provided with public key identification data over both NFC communication and Wi-Fi communication thereby providing a full two-way authentication. Furthermore, the two-way authentication is based on both communication units receiving NFC public key identification data. Accordingly, in order for an attacking device to perform a successful e.g. man-in-the-middle attack, it is not sufficient for the attacking device to receive NFC communications but rather it must also be able to transmit false public key identification data to the communication units over NFC. As the communication units will use standard NFC receivers, the range of such communication can be guaranteed to be restricted to very short ranges and therefore the user will be able to manually ensure that no attacking device is sufficiently close to provide false public key identification data.

Indeed, for conventional authentication principles based on one way authentication using NFC communication, the authentication typically relies on one communication unit providing data to the other unit over NFC communication, and this communication unit then using the provided data to perform the one-way authentication. For example, communication unit A may provide a nonce or a pin code to communication unit B using NFC communication. The nonce may then be communicated back to communication unit A as part of the Wi-Fi communication setup. Communication unit A then compares the received nonce to that provided over NFC and if they match it considers that the Wi-Fi communication setup is indeed with communication unit B.

However, the Inventor has realized that such a one way authentication may not be sufficiently secure. For example, an attacking communication unit could be designed to have a receive sensitivity which far exceeds that of the NFC specifications, and accordingly it may be possible for the attacking communication unit to receive the NFC transmission over substantially longer distances than those expected for NFC. As the security provided by the out-of-band NFC data exchange is based on the restricted range of the NFC communication, the security may be compromised by the possibility of such attacking communication units. For example, the attacking communication unit may be able to receive the transmitted nonce or a pin code and may initialize a Wi-Fi setup with communication unit B pretending to be communication unit A. Thus, out of band one way authentication may be less secure than generally believed in the field.

However, in the current approach, a two-way authentication is used with out of band NFC communications being provided in both directions. Thus, both communication units perform authentication based on received NFC data, and none of the communication units perform authentication based only on data received over Wi-Fi or transmitted over NFC. This provides increased security as the NFC receivers of the communication units will be designed to follow the specifications of NFC and in particularly will be designed to have a very limited range. It can accordingly be ensured that the NFC data is provided from an NFC transmitter within a few centimeters of the NFC receiver, and thus it can be manually ensured that the data is for the intended communication unit. Thus, the approach may ensure that the security provided by the assumption of the very restricted range of NFC communications is valid.

Furthermore, the approach allows for the determination of a shared session key which is derived from the public keys and this shared session key can be used to protect the transfer of a network key between the two parties that each has generated the shared session key. However, as both communication units require matching public key identification data being provided over NFC, the determination of the session keys can be guaranteed to be the same, i.e. it can be ensured that the public keys used are indeed those of the intended other party and not a potential attacking communication unit. One communication unit furthermore generates a network key which can be used for encrypted communication between the communication units. The network key is encrypted using the session key determined based on the public key of the other communication unit and transmitted to the other communication unit. This communication unit generates the session key using the public key authenticated by NFC and thus will only be able to decrypt the network key if this is indeed from the intended other party. If so, it decrypts the received network key and communication can proceed using this network key for encryption operations.

The out of band communication is not specifically customized or e.g. session specific, variable or secret data but rather is simply data which identifies the public key of the communication unit. Thus, the approach provides secure authentication while only using out of band transmission of standard, static and publicly available public key information. This may substantially reduce complexity and allow increased flexibility and an improved user experience. For example, it may allow that an RFID tag is used to provide the public key identification data to other communication units.

Indeed, no security risk is introduced by a potentially attacking communication unit being able to receive the public key identification data provided by NFC communication. Rather, this may only allow the attacking communication unit to determine the public key of the communication units but this would still not allow it to determine secure session keys, i.e. it would not be able to generate the same session key from the public key as will be generated by the first communication unit as it does not have access to the private key.

Thus, the two-way authentication uses out of band NFC communications in both directions to ensure that the session key for the Wi-Fi communication is generated from the correct public keys, i.e. each of the communication units can be certain that the Wi-Fi communication is with the intended other party.

Thus, each of the first communication unit 101 and the second communication unit 103 evaluates whether the Wi-Fi communication will be set up to use a session key derived from the appropriate public keys. If the public key identification data received over NFC and Wi-Fi correspond to matching public keys, it must mean that the Wi-Fi communication originated from the intended communication unit. As each communication unit 101, 103 has determined the session key from a public key confirmed or provided via an NFC communication, it can furthermore be ensured that the keys will only be known by communication units for which the NFC communication has been physically enabled by bringing the respective NFC communication means sufficiently close to each other (e.g. by bringing the communication devices close to each other, or by bringing a NFC tag close to an NFC reader). Typically, it is required that a user manually brings the NFC antennas (of devices or tags as appropriate) within a couple of centimeters of each other. Therefore, the approach ensures that NFC public key identification data will only be exchanged between two devices that have at one stage been physically coupled such that the NFC antennas are sufficiently close to each other for the public key identification data to be transferred. Thus, the physical limitations of NFC communication ensure that the user can control which public keys are used in each communication unit, and thus that each communication unit can, with a high degree of certainty, be guaranteed to use the public key of the intended other communication unit and not of a potential attacking communication unit. In particular, whereas it may be possible that NFC communications can be intercepted at distances of perhaps several meters, a user can generally be sure that data which is read by a standard NFC receiver will have originated from the device which has been put in NFC contact with the NFC reader.

In more detail, the first communication unit 101 comprises a first NFC transmitter 207 which is capable of transmitting data over an NFC communication link and a first NFC receiver 205 which is capable of receiving data over an NFC communication link. Likewise, the second communication unit 103 comprises a second NFC transmitter 307 which is capable of transmitting data over an NFC communication link and a second NFC receiver 305 which is capable of receiving data over an NFC communication link. Thus, if the first communication unit 101 and the second communication unit 103 are positioned sufficiently close together (say within a few centimeters), they may exchange data via the NFC communication links.

The first NFC transmitter 207 and the first NFC receiver 205 are coupled to a first NFC controller 209 which controls the communications over the NFC communication links. Similarly, the second NFC transmitter 307 and the second NFC receiver 305 are coupled to a second NFC controller 309 which controls the communications over the NFC communication links.

The first NFC controller 209 and the second NFC controller 309 control the NFC communications such that when the first communication unit 101 and the second communication unit 103 are brought sufficiently close together and within NFC communication range, the first NFC receiver 205 receives NFC data from the second NFC transmitter 307 and specifically receives first public key identification data which is indicative of the public key of the second communication unit 103. Similarly, the second NFC receiver 305 receives NFC data from the first NFC transmitter 207 and specifically it receives third public key identification data which is indicative of the public key of the first communication unit 101. Thus, when the two communication units 101, 103 are brought into contact with each other, public key identification data is exchanged over the NFC communication links so that each communication unit will be informed of the public key of the other communication unit.

The first NFC controller 209 is coupled to a first key store 211 which stores the public key of the first communication unit 101 and which provides it to the first NFC controller 209 for generating the public key identification data for transmission by the first NFC transmitter 207 (also referred to as the second public key identification data). Similarly, the second NFC controller 309 is coupled to a second key store 311 which stores the public key of the second communication unit 103 and which provides it to the second NFC controller 309 for generating the public key identification data for transmission by the second NFC transmitter 307 (also referred to as the first public key identification data).

The first NFC controller 209 and the first communication controller 203 are coupled to a first comparator 213 which is arranged to generate a first match indication indicative of whether the public key identification data received over the Wi-Fi connection (the third public key identification data) matches the public key identification data received over the NFC communication link (the first public key identification data). Similarly, the second NFC controller 309 and the second communication controller 303 are coupled to a second comparator 313 which is arranged to generate a second match indication indicative of whether the public key identification data received over the Wi-Fi connection (the fourth public key identification data) matches the public key identification data received over the NFC communication link (the second public key identification data).

The first match indication is fed back to the first communication controller 203 and the second match indication is fed back to the second communication controller 303. If the match indication indicates that there was no match between the public key identification data received over Wi-Fi and NFC, the corresponding communication controller 203, 303 proceeds to terminate the Wi-Fi communication. If the correct public key as indicated by the NFC data exchange is not used by the Wi-Fi communication, this indicates that the Wi-Fi communication may not be between the intended parties and may be with an attacking unit. Accordingly, the communication controller 203, 303 detecting such a lack of a match will terminate the Wi-Fi communication.

The system utilizes this out-of-band verification as part of an authentication and communication setup which results in the secure transfer of a network key that can be used for the specific setup and which can be ensured is exchanged between the intended parties. In the example, the first communication unit 101 seeks to initiate a new secure Wi-Fi communication with the second communication unit 103. Accordingly, it seeks to use encryption and therefore a network key is to be established. The first communication unit 101 and the second communication unit 103 may proceed to perform a secure Wi-Fi setup which will establish a suitable session key and network key. This process includes the communication units exchanging public key identification data which allows one communication unit to determine the public key of the other communication unit.

Thus, the first communication unit 101 proceeds to initialize a new Wi-Fi communication by performing Wi-Fi communications to setup a new Wi-Fi communication link. The Wi-Fi communication is thus with a remote Wi-Fi communication unit which the first communication unit 101 intends to be the second communication unit 103. However, the first communication unit 101 cannot initially be certain that the Wi-Fi communication unit it is communicating with is indeed the second communication unit 103 and not an attacking communication unit.

Similarly, the second communication unit 103 may perform Wi-Fi communications to setup a new Wi-Fi communication link. Specifically, it may receive messages over Wi-Fi which initializes a new communication setup procedure. The second communication unit 103 communicates with a remote Wi-Fi communication unit but it cannot initially be sure of the identity of this communication unit. Thus, the second communication unit 103 cannot initially be certain that the Wi-Fi communication unit it is communicating with is indeed the first communication unit 101 and not an attacking communication unit. Therefore, the Wi-Fi communication initializes with each of the communication units in essence communicating with unknown (or at least non-authenticated) Wi-Fi communication units. Indeed, the Wi-Fi communication unit could be the intended other party or could be an attacking party.

Specifically, the first communication unit 101 may start the setup procedure and as part of this procedure, it communicates public key identification data which is indicative of the public key of the first communication unit 101 to the second communication unit 103. The second communication unit 103 thus receives public key identification data over Wi-Fi. This public key identification data received by the second communication unit 103 is referred to as the fourth public key identification data and in the normal case, it is indeed the public key identification data transmitted from the first communication unit 101. However, in the case of e.g. a man-in-the-middle attack, the received fourth public key identification data may indeed be public key identification data which indicates the public key of the attacking unit.

In the approach, the user brings the first communication unit 101 and the second communication unit 103 (or at least the appropriate NFC communication functionality) into sufficiently close contact with each other to allow the NFC transmission of public key identification data. Thus, in addition to the fourth public key identification data received over Wi-Fi, the second communication unit 103 also receives second public key identification data indicative of the public key of the first communication unit 101 over NFC. Similarly, the first communication unit 101 receives first public key identification data indicative of the public key of the second communication unit 103 over NFC.

The public key identification data received by the NFC receivers of the first communication unit 101 and the second communication unit 103 can be guaranteed to be received from very close (a few cms) NFC sources, this data can be trusted to correspond to the correct public key, i.e. the first communication unit 101 can trust the first public key identification data and the second communication unit 103 can trust the second public key identification data.

The second comparator accordingly compares the second and fourth public key identification data and generates a second match indication which reflects whether these correspond to the same public key or not. If this is not the case, it is likely that the second communication unit 103 is not communicating with the first communication unit 101 as intended but rather that it communicates with an attacking unit seeking to provide the second communication unit 103 with its own public key. Thus, in this case, the Wi-Fi communication unit that the second communication unit 103 is communicating with is not the intended other party (i.e. it is not the first communication unit 101) but is instead a third party, and may specifically be an attacking device. In this case, the second communication controller 303 therefore proceeds to terminate the communication setup. In this case, it may furthermore transmit a message back to indicate that an error has occurred and that the communication is being terminated.

However, if the match indication indicates that the second and fourth public key identification data matches, the second communication unit 103 considers the unknown Wi-Fi communication unit to be authenticated, i.e. it concludes that the Wi-Fi communication with which it is communicating is indeed with the first communication unit 101 as indicated by the NFC communication. Thus, in this case the unknown Wi-Fi communication unit is concluded to indeed be the first communication unit 101.

In this case, the second communication controller 303 proceeds to generate a session key based on the public key of the first communication unit 101 and also generates a network key (a network key may be any suitable key that can be used for encryption) which can be communicated to the first communication unit 101.

As a first step, the second communication controller 303 may generate the public key of the first communication unit in response to at least one of the second public key identification data and the fourth public key identification data.

Thus, the first step is to determine the public key of the first communication unit 101. The public key may thus be generated from the public key identification data received over the Wi-Fi or from the public key identification data received over NFC. Indeed, as the session key will typically only be generated if the Wi-Fi communication setup is not terminated, and thus when the second public key identification data and the fourth public key identification data match, both public key identification data will result in the public key of the first communication unit 101.

The second communication controller 303 then proceeds to generate a session key (henceforth referred to as the second session key) from the public key of the first communication unit 101 and a private key of the second communication unit (103).

The second communication controller 303 furthermore generates a network key (henceforth referred to as the second network key) which may be any key suitable for encryption operations. It will be appreciated that any approach for generating the network key may be used. Typically, the network key is generated as a temporary key, e.g. which is only applicable to the current communication (or part of the communication). In many embodiments, the network key may simply be generated as a random number of the desired length. In other embodiments, the same network key may be (re-) used for new communication with the same device.

The second communication controller 303 then proceeds to generate an encrypted network key (henceforth the second encrypted network key) by encrypting the second network key using the second session key. Thus, the second network key cannot be generated from the second encrypted network key unless the recipient has knowledge of the second session key. However, as this is generated using the private key of the second communication unit 103 and the public key of the first communication unit 101, (e.g. by the special properties of the Diffie-Hellman key exchange algorithm), only the first communication unit 101 is able to recreate this session key, and thus to decrypt the second encrypted network key.

The second communication controller 303 then proceeds to transmit the second encrypted network key to the other communication unit, i.e. to the communication unit which is assumed to be the first communication unit 101. In addition, the second communication unit 103 also transmits public key identification data indicative of the public key of the second communication unit 103 to the other Wi-Fi communication unit (and thus in nominal situations to the first communication unit 101).

The first communication unit 101 accordingly experiences that it initializes a communication setup with a remote Wi-Fi communication unit which it assumes is the second communication unit 103. In response to the initialization message(s), it receives an encrypted network key and public key identification data indicative of the public key of the other communication unit (i.e. it receives the third public key identification data). It also has first public key identification data which is indicative of the public key of the second communication unit 103. However, the first communication unit 101 does not just assume that the received data is from the second communication unit 103, i.e. it does not just assume that the Wi-Fi communication unit with which it is communicating is the second communication unit 103 but instead proceeds to check this.

Therefore, the first comparator 213 proceeds to compare the first and third public key identification data to generate the first match indication.

Accordingly, if the first match indication indicates that the first and third public key identification data meet a suitable match criterion, the received data is considered to indeed be from the second communication unit 103, i.e. the Wi-Fi communication unit from which the data is received is considered to indeed be the second communication unit 103. In this case, the first communication controller 203 continues with the Wi-Fi communication and specifically it may proceed to setup a Wi-Fi communication with the second communication unit 103. However, if this is not the case, the first communication unit 101 considers the received data to be from a potentially attacking communication unit and it proceeds to terminate the communication setup. Thus, in this case the Wi-Fi communication unit with which the first communication unit 101 is communicating is concluded not to be the second communication unit 103.

If the match indication indicates that the first and third public key identification data, the first communication controller 203 proceeds to retrieve the network key from the message, i.e. it generates a first network key which is identical to the second network key.

Specifically, the first communication controller 203 first generates the public key of the second communication unit 103 from either first public key identification data or the third public key identification data (or both).

It then proceeds to generate a first session key from the public key of the second communication unit 103 and a private key of the first communication unit 101. When the first communication unit 101 and second communication unit 103 communicate directly, the first and the second session keys will be identical due to specifically the special properties of the Diffie-Hellman key exchange algorithm.

As each communication unit generates the session key from the public key of the other communication unit and its own private key, the determined session keys will be identical. Accordingly, the first communication unit 101 and second communication unit 103 can proceed to establish a secure Wi-Fi communication using the determined session key.

As a more detailed example, the first key store 211 stores the public key for the first communication unit 101. The public key is specifically a Diffie-Hellman key and may specifically be generated using the equation $A=g^a \mod p$ where a is a secret value known only to the first communication unit 101, p is a prime number and g is a number referred to as the base. The secret value is also known as the private key of/for the first communication unit 101.

Likewise, the second key store 311 stores the public key for the second communication unit 103. The public key is specifically a Diffie-Hellman key and may specifically be generated using the equation $B=g^b \mod p$ where b is a secret value known only to the second communication unit 103, p is the prime number and g is the base which may be the same as those used by the first communication unit 101. The secret value is also known as a private key of/for the second communication unit 103.

The first communication controller 203 receives the received public key, i.e. the public key of the second communication unit 103, as well as the secret value (a) of the first communication unit 101. It then proceeds to calculate the session key by combining the second public key and the private (secret) value/key of the first communication unit 101.

Specifically, the first communication controller 203 may proceed to calculate the value $B^a \mod p$ where a is the local secret/private value (private key) and B is the received second public key (and p is still the base). Thus, a session key referred to as the session master key is calculated as the value $B^a$ mod p.

The terms session master key and session key will be used to denote respectively the key generate by the Diffie Hellman approach, i.e. as $B^a$ mod p (or as $A^b$ mod p for the other communication unit) and a key used to encrypt the network key and which is derived from the session master key. However, it will be appreciated that no limitation is intended thereby, i.e. the session master key may be considered a session key and indeed in some embodiments or scenarios the session master key may be used directly as a session key to encrypt and decrypt the network key.

Likewise, the second session key generator 317 receives the received public key, i.e. the public key of the first communication unit 101 as well as the secret key of the second communication unit 103. It then proceeds to calculate the corresponding session key which will be the same as that which will be calculated by the first communication controller 203.

In more detail, the second communication controller 303 may proceed to calculate the value $A^b$ mod p where b is the local secret number (private key) and A is the received first public key (and p is still the base). Thus, the session master key is calculated as the value $A^b$ mod p. Since $$A^b \bmod p = B^a \bmod p$$

the keys generated in respectively the first communication unit 101 and the second communication unit 103 are identical. Furthermore, the keys are generated based only on publicly available information and local secret information that is not communicated externally of the individual device. Accordingly, the keys cannot be generated by other devices even if they are able to intercept the NFC communications. Specifically, in order to calculate the session master key, either the secret value a or the secret value b must be known. However, as none of these are available to external devices, these cannot generate the key.

It will be appreciated that in some embodiments and scenarios, the full (Diffie-Hellman) session master key which is generated as described above may not be used directly as the session key. Rather, the session key may be generated from the session master key, using a predetermined algorithm that may in addition use data that both communication units have exchanged and/or have knowledge of. Thus, a session master key may be generated by combining the local secret value with the received public key (e.g. using the Diffie Hellman approach as described above) with the session key being derived therefrom using a predetermined algorithm. The predetermined algorithm may be as simple as selecting a subset of bits of the session master key, or it may be a more complex algorithm.

For example, WSC defines some specific keys that can be derived from a (Diffie-Hellman) session master key:
AuthKey (256 bits),
KeyWrapKey (128 bits),
EMSK (256 bits).

It will be appreciated that any of these keys (or indeed any other key derived from the master key, including the session master key itself) could be used as a session key.

The first communication unit 101 and second communication unit 103 may accordingly proceed to use the same session keys. Furthermore, as the session key is generated independently by each device based on keys confirmed by NFC transmissions over very short distances, the approach ensures that the Wi-Fi communication using the generated session key can only be performed by devices that have physically been able to exchange the public key identification using NFC. Thus, a high degree of security both in terms of the encryption of data and in terms of the communication being between intended (authenticated) communication units is achieved.

The first communication controller 203 then proceeds to generate a first network key by decrypting the first encrypted network key using the first session key. Thus, a local network key is generated by decrypting the received encrypted network key using the locally generated session key which is based on the authenticated public key of the second communication unit 103.

The first communication controller 203 then proceeds to communicate with the remote Wi-Fi communication unit (which is now authenticated as indeed being the second communication unit 103) using the derived network key, which will be the same as the network key that was derived by the second communication unit 103.

Thus, a secure communication setup supporting encryption is achieved.

In scenarios wherein the first communication unit 101 determines that the first public key identification data and the third public key identification data do not match, it may in addition to terminating the Wi-Fi communication proceed to generate an authentication failure message which is transmitted to the second communication unit 103, typically using Wi-Fi. In response to receiving such a message, the second communication unit 103 proceeds to terminate the Wi-Fi communication setup operation.

This may allow both communication units 101, 103 to terminate communication in case of a potential error or attack even if this is only detected by one of the communication units 101, 103. In many embodiments, the first communication unit 101 and/or the second communication unit 103 may also comprise functionality for alerting a user to the termination of the communication (setup).

In some embodiments, the communication controllers 203, 303 may e.g. still allow a different communication connection to be established if the ongoing Wi-Fi communication setup is terminated. For example, a non-secure communication link may be established allowing for some exchange of information. In such a case, the user application (or the user) will be informed that the communication link is not secure and thus that only data which may be intercepted should be transmitted.

In the system, the first communication unit 101 and the second communication unit 103 may thus use the NFC communication to initially establish a contact which is then used in setting up a Wi-Fi connection between the communication units 101, 103.

The approach may provide improved security. In particular, the Inventor has realized that current approaches based on NFC authentication can provide imperfect security. Indeed, it is currently understood that authentication using a single NFC communication as used in the prior art can provide sufficient security and robustness due to the limited range of the NFC communication. However, the Inventor has realized that it is advantageous to use a two-way NFC based authentication which can ensure that both communication units receive transmission which originate from within a few centimeters. Indeed, the approach used by the first communication unit 101 and the second communication unit 103 is not sensitive to potential attacking communication units overhearing the NFC communications. Indeed, the NFC communications may typically include only publicly available information, including specifically the public key identification data, and all data may be provided in the clear.

However, even if a potential attacking communication unit overhears this NFC communication, it cannot use this to establish a Wi-Fi communication with either of the first communication unit 101 and the second communication unit 103.

In order to illustrate the improvement, a scenario in accordance with the prior art approach of WSC may be considered. In such an approach, a device PIN or device Password may be used to authenticate two Wi-Fi devices to each other. Only the two involved devices should know the device PIN or Password. However, if another device is able to determine the device PIN or device Password, it can use this to setup separate communications with the device from which the PIN originated.

Indeed, a user can even be fooled into thinking that a Wi-Fi connection was set up between two devices by bringing these two devices into NFC contact with each other, e.g. by touching one of these devices with an NFC tag of the other device. For example, a user may want to setup a Wi-Fi connection between a first device and a second device. The user starts the standard Wi-Fi pairing procedure by exchanging keys by communicating the M1 and M2 messages over Wi-Fi. However, unbeknownst to the user, the first device is actually exchanging M1 and M2 messages over Wi-Fi with a third device. This may have happened accidentally or it may have happened on purpose by the third device. The user may then proceed to use an NFC tag of the first device to transfer the device PIN of the first device to the second device (which the user/first device believes is also the other party for the Wi-Fi communication). As specified in WSC, this NFC tag contains the PIN of the first device and a hash of the public Diffie-Hellman key of the first device (the public Diffie-Hellman key is the value A or B in the formulas above; the values a and b are the private Diffie-Hellman keys). The user wants to connect the first device to the second device, and accordingly touches the NFC reader of the second device with the NFC tag of the first device. The second device is not in the process of setting up any communication so it merely reads the NFC tag and does not take any further action. (If the second device happened to be in the process of a Wi-Fi pairing procedure with a fourth device, it would terminate this as the data read from the pin will not match the Wi-Fi communication from the fourth device).

However, if the third device is capable of reading the NFC tag, it may exploit the information in the tag. Indeed, whereas it has been believed that NFC communications are limited to a range of only a few centimeters, it has been found that by using specially developed and highly sensitive circuitry, it may be possible to read NFC communication and tags at up to several meters. This is something that the typical NFC readers that are in common use in products are not able to do and do not have to be able to do. Therefore, if the third device comprises such a sensitive NFC reader it may be able to intercept the values read from the NFC tag by the second device. The third device now knows the PIN of the first device. The third device can therefore proceed to exchange messages M3-M7 with the first device. M3-M7 are messages that devices use in WSC to reveal the knowledge of the PIN to each other to confirm that they possess the same PIN (and if they do not the communication setup will be terminated). In the example, the third device has knowledge of the correct pin and the communication setup can accordingly be completed as the first device will detect no problem and believe that it is setting up a Wi-Fi communication with the second device. As part of this communication, the network key and other secret Wi-Fi configuration data will be transmitted in the message M8. The data is encrypted with a key derived from the Diffie-Hellman key. However, since the third device has obtained the correct PIN from the first device, the procedure will proceed such that the first and third device are communicating over Wi-Fi, while the user thinks that it is the first and second device which are communicating. Furthermore, the third device has access to the Diffie-Hellman key and can thus decrypt all the secret data provided in the M8 message. This includes the secret network key (PMK) thereby allowing the third device to use this in the future.

However, in the approach used by the first communication unit 101 and second communication unit 103, such a scenario cannot occur. Indeed, all NFC communicated data can be public data communicated in the clear. Thus, all the NFC communicated data may be intercepted by any other communication unit but cannot be used to setup an authorized Wi-Fi communication. Rather, each of the first communication unit 101 and the second communication unit 103 only completes the communication setup if they have received NFC communication data that identifies the same public key as used for the Wi-Fi communication. As this data is retrieved using the NFC receivers 205, 305 of the first communication unit 101 and second communication unit 103 respectively (which can be designed to have only normal communication range, e.g. a few centimeters), the range of the NFC communication is inherently limited. Thus, an attacking device would not be able to setup a Wi-Fi communication based on only reading NFC data but would instead need to itself provide such NFC data. However, as this is only possible if physical proximity is provided, the user can ensure that this does not occur. Indeed, if a user brings two NFC devices together, he may not be completely certain that a third party device cannot possibly intercept one or more of the NFC messages between the two devices. However, the user can generally be certain that the data received by the devices originate from the other device since it is not practically feasible for third parties to use NFC to transmit data to the two devices over longer distances.

The public key identification data may be any data that allows the corresponding public key to be (in some cases partially) identified. In some embodiments, the public key identification data may directly be a complete representation of the corresponding public key (e.g. as a binary number in a suitable format) or may for example be a hash generated from the public key. In some embodiments, the first public key identification data may comprise a device identification of the first communication unit 101 which allows the public key to be retrieved from a local or remote storage (e.g. by a table look-up). For example, the user may manually have entered a number of public keys and associated device identities into the first communication unit 101. In such cases, the public key identification data may simply be provided by the device identity.

In some embodiments, the public key identification data may be e.g. an NFC tag identification. For example, a standard NFC tag which simply provides a tag identity when read may be procured by a user. The user may then enter the public key of the second communication unit 103 into the first communication unit 101 together with the tag identity. Thus, the user may link the tag identity to the public key of the second communication unit 103 thereby using the tag identity as public key identification data. In this way, the NFC transmitter of the second communication unit 103 will be implemented by the tag and the second public key identification data will be implemented by the tag identity.

In some embodiments, the public key identification data of at least one of the Wi-Fi and NFC communications may contain the public key itself. Alternatively or additionally, it may contain e.g. a hash of the public key. In many embodiments, it may be particularly advantageous for the first and second public key identification data to comprise a hash of the public keys whereas the third and fourth public key identification data contain the full public keys, i.e. the Wi-Fi communications may provide the full public key identification data whereas the NFC communication provides hashes of the public keys.

It will be appreciated that different approaches for determining the match indication may be used in different embodiments. Typically a binary match indication is generated which will simply indicate whether the public key identification data of the Wi-Fi and NFC communications match or not. The specific criterion used for considering a match to exist may vary between different embodiments.

In embodiments wherein both public key identification data provides a unique identification of a public key, it may be required that the corresponding public keys are identical. E.g. the first and third public key identification data may be considered to match if, and only if, they identify exactly the same public key.

In such cases the first communication unit 101 may proceed to first generate the public key from respectively the first public key identification data and the third public key identification data. If the resulting public keys are identical, a match may be deemed to exist and otherwise a match may be deemed not to exist.

For example, the third public key identification data may directly provide a public key and the first communication controller 203 may simply extract the appropriate data and provide the corresponding public key to the first comparator 213. The third public key identification data may comprise a hash of the public key or a device identity. In such scenarios, a local memory may comprise lists of public keys and associated hashes or device identities. The first NFC controller 209 may simply find a matching entry for the received hash/identity and retrieve the corresponding public key and provide it to the first comparator 213 for comparison. The store may have been manually populated by a user or may e.g. have been automatically updated by retrieving appropriate public keys from a remote server. In some embodiments, the communication units may access a remote server (e.g. via an Internet connection) to obtain the public key that matches a given hash or device identity.

In some embodiments, the first or third public key identification data may comprise a non-unique identification of the corresponding public key. In such scenarios, the first comparator 213 may deem the public key identification data to match if there exists at least one public key which may be represented by both the first public key identification data and the third public key identification data. For example, different public keys may potentially result in the same hash or a device identity may be associated with different public keys. If the third public key identification data provides a full representation of a public key whereas the first public key identification data provides only a hash or device identity, a match may be considered to exist if the public key represented by the third public key identification data is one that could give rise to the hash of the first public key identification data or is linked to the device identity of the first public key identification data.

In some embodiments a particularly efficient operation may be performed in scenarios where the first public key identification data comprises a first hash of the public key. In such cases, the public key represented by the third public key identification data may first be determined. A hash operation corresponding to that used to generate the first public key identification data may then be applied to the derived public key. The resulting hash is then compared to that of the first public key identification data. If they are identical, a match between the first and third public key identification data is deemed to exist and otherwise a match is deemed not to exist.

It will be appreciated that the comments apply equally to the determination of a match indication for the second and fourth public key identification data.

In the system of FIG. 1, the first communication unit 101 and the second communication unit 103 are arranged to only transmit secret data to another communication unit when the match criterion has been met. Secret data may be any data for which the distribution is to be controlled, i.e. it may be any data which is not public data. The secret data may specifically comprise network secrets such as the PMK or the PSK.

Such secret data may be provided over a Wi-Fi communication link. Specifically, secret data may be provided in the M8 message of the Wi-Fi communication setup. However, in the system, the communication units 101, 103 are arranged to perform the check of a match between the public key identification data prior to the transmission of any such message.

In some embodiments, NFC communication may be used to transmit secret data. For example, the PMK or PSK may be communicated via an NFC communication. In such embodiments, the data communicated using NFC may be encrypted using the session key in order to ensure that third parties cannot access the information even if they are able to intercept the NFC data.

In some embodiments, the data communicated via the NFC communication (to at least one of the first communication unit 101 and the second communication unit 103) may include Wi-Fi configuration data. This Wi-Fi configuration data can then be extracted by the first communication controller 203 or the second communication controller 303 respectively and can be used to configure the Wi-Fi communication.

For example, the Wi-Fi configuration data may include information of which Wi-Fi channel should be used for the Wi-Fi over the air transmission. The first communication controller 203 or the second communication controller 303 may extract this information and ensure that the following Wi-Fi operations use this channel.

The NFC data may thus comprise information that makes it easier for the receiving communication unit to find the other communication unit using Wi-Fi. This may e.g. be done by providing data indicative of the identity, desired Wi-Fi channel, etc. Specifically, such data may reflect information that could have been obtained by receiving Beacon frames, Probe Request and Response messages, Authentication Request and Response messages, and Association Request and Response messages. This Wi-Fi related information may make the exchange of many Wi-Fi messages unnecessary thereby allowing for a faster and less resource demanding setup.

The previous description has mainly reflected a scenario wherein the first communication unit 101 and the second communication unit 103 communicate directly over an NFC communication link. Such a communication link may for example be achieved using the peer-to-peer communication approach of NFC.

However, in other embodiments, the NFC communication link between the first communication unit 101 and the second communication unit 103 may include a wireless NFC communication link but may also include other parts or sections. Indeed, such parts may be included in non-real time communication wherein data is stored on a physical medium. Specifically, the NFC communication may be achieved using an NFC tag on which the data being exchanged using NFC communication may be stored. Thus, specifically, the NFC transmitters 207, 307 may be implemented as NFC tags, and specifically as static NFC tags that provide the public key identification data. The NFC transmitters 207, 307 may thus be passive transmitters which are powered by the corresponding NFC receivers 205, 305 when being read.

The terms NFC receiver and transmitter refer to functionality of the two ends executing the NFC communication. Thus, the term NFC transmitter refers to a function that can communicate data over an NFC communication link (e.g. by being read) and the term NFC transmitter refers to a function that can receive data over an NFC communication link (e.g. by reading an NFC transmitter).

The communication may be by use of NFC peer-to-peer mode in which case the term NFC transmitter refers to the peer-to-peer NFC transmitter functionality and the term NFC receiver refers to the peer-to-peer NFC receiver functionality. In this case, an NFC transmitter sends a signal to the NFC receiver of the other device and vice versa.

The NFC communication may in some embodiments be by use of NFC tags. In order to read an NFC tag using NFC, an NFC reader applies an NFC signal, which the tag may use to power itself and which signal the NFC tag modulates (e.g. by varying the amount of NFC signal that the NFC tag absorbs), such that the NFC reader can detect the modulation and receive the information that the NFC tag had to transfer to the NFC reader. Thus, the NFC transmitter may be an NFC tag which allows data to be communicated over the NFC wireless connection. Similarly, the NFC receiver may be an NFC reader which can read an NFC tag, i.e. it can receive data from the NFC tag over the NFC wireless communication link.

In order to write an NFC tag using NFC, an NFC writing device applies a signal, but this time modulates it by itself using the information it wants to write into the NFC tag. The NFC tag use that signal to power itself. The NFC tag detects the modulation of the NFC signal and stores this information. In such a scenario, the NFC transmitter may be an NFC writer capable of writing data to an NFC tag over an NFC connection and the NFC reader may be an NFC tag.

As yet another option, the NFC communication may be implemented using an NFC tag as an intermediate. Indeed, it is possible to use also NFC tags without electrical interfaces for two-way communication. For example, an NFC tag may first be brought into NFC contact with an NFC writer of, say, the first communication unit which writes data (specifically public key identification data) onto the tag. The tag is then physically moved and brought into contact with the second communication unit which reads the data from the tag (i.e. the second public key identification data). In this way, an NFC communication has been performed. In such a scenario, the NFC writer of the first communication unit may be considered an NFC transmitter and the NFC reader of the second communication may be considered an NFC receiver.

In some scenarios, the tag may also be used for communication in the reverse direction. For example, the second communication unit may also comprise an NFC writer which can then write the first public key identification data into the tag, thereby possibly overwriting the second public key identification data. The tag is then brought into NFC contact with the first communication unit which may comprise an NFC reader which reads the NFC tag. In this scenario, the NFC writer of the second communication unit may be considered an NFC transmitter and the NFC reader of the first communication may be considered an NFC receiver.

In some embodiments, the same functionality may be used for both NFC reading and writing and this functionality may thus implement both the NFC transmitter and NFC receiver.

As an example, in some embodiments, an NFC tag may first be connected to, say, the first communication unit 101 and then physically moved to the second communication unit 103 by the user. Thus, in such embodiments, the NFC communication may include two wireless NFC communication sub-links. Furthermore, the exchange of the first public key identification data from the second communication unit 103 to the first communication unit 101, and of the second public key identification data from the first communication unit 101 to the second communication unit 103, may be achieved using one NFC tag which is rewritten as part of the process. For example, the first communication unit 101 may first write its public key on the NFC tag and this may be coupled to the second communication unit 103 which proceeds to read it, after which it writes its own public key to the same NFC tag. The user then brings the NFC tag into contact with the first communication unit 101 which can accordingly read the public key of the second communication unit 103. In other scenarios, two NFC tags may e.g. be used, or a tag may be used in one direction with direct peer-to-peer communication being used in the other direction.

In some embodiments, the NFC tag may comprise the public key of e.g. the first communication unit 101 stored in a permanent form such that the data cannot be changed. However, the NFC tag may further contain a read/write part, to which the second communication unit 103 can write its NFC tag. The use of a single NFC tag may in practice typically facilitate operation since it requires only that the same NFC tag is first NFC coupled to one communication unit (the second communication unit 103 in the example) and then to the other communication unit (the first communication unit 101 in the example). Thus, two rather than three couplings (typically touches) are used.

It will also be appreciated that in some embodiments, an NFC tag may physically be attached to or embedded in one or both of the communication devices 101, 103.

Specifically, the first communication unit 101 may be arranged to transmit the second public key identification data to the second communication unit 103 by transferring the appropriate data into an NFC tag. Such an operation may be possible using an NFC writing operation in accordance with the standards for writing data into an NFC tag. Thus, the first communication unit 101 may comprise an NFC writer for wirelessly writing a tag. The second communication unit 103 may then accordingly be able to read the tag in order to retrieve (receive) the public key identification data from the first communication unit 101 to the second communication unit 103, i.e. the second communication unit 103 may comprise wireless NFC reading functionality.

In other embodiments, the first communication unit 101 may be arranged to write the second public key identification data to the NFC tag using a wired non-NFC communication link. Specifically, many NFC tags comprise an interface allowing a host device to directly connect to the tag in order to write data into the storage means of the tag. For example, a microprocessor of the first communication unit 101 may be connected to NFC tag functionality that allows it to write directly to the tag via the (non NFC) connection. Such an approach may be particularly suitable for scenarios wherein the NFC tag is part of one physical device comprising all functionality of the first communication unit 101 but may also be useful if the NFC tag is external to a device comprising most of the functionality of the first communication unit 101 (e.g. all functionality except for the NFC tag). For example, the device may comprise a mechanical connector in which the tag may be inserted.

Similarly, in some embodiments, the second communication unit 103 may be arranged to read the data from the NFC tag using a wired non-NFC communication link. Specifically, many NFC tags comprise an interface allowing a host device to directly connect to the tag in order to read data from the storage means of the tag. For example, a microprocessor of the second communication unit 103 may be connected to NFC tag functionality that allows it to read directly from the tag via the (non NFC) connection.

In some embodiments, information on which approach should be used may be communicated in the NFC messages used to set up the session (master) key.

If the NFC peer mode is used, the NFC connection can simply be achieved by bringing the first communication unit 101 and the second communication unit 103 sufficiently close to each other.

In many embodiments, instructions may be provided to the user by the first communication unit 101 and/or the second communication unit 103. For example, specific instructions may be provided on a suitable display. Furthermore, the instructions may be dynamically updated in line with the user performing the different actions.

In some embodiments, the data communicated using NFC communication by the first communication unit 101 (and/or by the second communication unit 103) may advantageously not contain any variable data. Thus, the communicated data may be static data that does not depend on any characteristics of the specific communication being set up. Thus, the data may not change between two subsequent Wi-Fi communication setups even if they are with different communication units. This may be particularly efficient in many embodiments, and many specifically allow a static NFC tag to be used. Thus, reduced complexity and cost of the system can be achieved. In some embodiments, the only data communicated over NFC may be the first public key identification data and the second public key identification data.

In other embodiments, the data communicated using NFC communication by the first communication unit 101 (and/or by the second communication unit 103) may advantageously include variable data. Thus, the communicated data may include data which is specific to the current communication setup.

Such data may for example comprise configuration data as previously described. In many embodiments, variable data may be provided in order to include challenge data for the other communication unit. Thus, the data communicated over NFC may include a nonce. The receiving communication unit may then generate data for the validation check based on this nonce.

For example, the first communication unit 101 may include a nonce in the data provided to the second communication unit 103 using NFC. The second communication unit 103 may then use this nonce when it generates data using the session key. The first communication unit 101 may accordingly receive data generated on the basis of both the session key and the nonce it provided itself via NFC. Such an approach may facilitate operation and/or improve security.

As a specific example, the first communication unit 101 may generate an NFC message which comprises challenge data (nonce) generated at random. This data may be non-encrypted. Upon receiving this message, the second communication unit 103 may generate a cryptographic hash for the received random data based on the session key. The resulting cryptographic hash may be included in a Wi-Fi message communicated back to the first communication unit 101.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method of operation for a wireless communication system comprising a first communication unit and a second communication unit, the method comprising:
   transmitting second public key identification data from the first communication unit to the second communication unit using Near-Field Communication (NFC), the second public key identification data being indicative of, but different from, a public key of the first communication unit;
   transmitting fourth public key identification data indicative of, but different from, the public key of the first communication unit from the first communication unit to a first wireless communication unit using an IEEE wireless protocol;
   receiving by the second communication unit the second public key identification data from the first communication unit using NFC;
   receiving by the second communication unit the fourth public key identification data from a second wireless communication unit using the IEEE wireless protocol;
   generating by the second communication unit a second match indication indicative of whether the second public key identification data matches the fourth public key identification data;
   terminating by the second communication unit wireless communication with the second wireless communication unit when the second match indication is indicative of the second public key identification data not matching the fourth public key identification data but then, when the second match indication is indicative of the second public key identification data matching the fourth public key identification data perform
   generating the public key of the first communication unit in response to least one of the second public key identification data and the fourth public key identification data,
   generating a second session key from the public key of the first communication unit and a private key of the second communication unit,
   generating a second network key,
   generating a second encrypted network key by encrypting the second network key using the second session key, and
   transmitting the second encrypted network key and public key identification data indicative of a public key of the second communication unit to the second wireless communication unit;
   transmitting first public key identification data from the second communication unit to the first communication unit using NFC, the first public key identification data being indicative of, but different from, a public key of the second communication unit;
   transmitting third public key identification data indicative of, but different from, the public key of the second communication unit using an IEEE wireless protocol;
   receiving by the first communication unit the first public key identification data from the second communication unit using NFC;
   receiving by the first communication unit the third public key identification data and a first encrypted network key from the first wireless communication unit using the IEEE wireless protocol;
   generating a first match indication indicative of whether the first public key identification data matches the third public key identification data;
   terminating by the first communication unit wireless communication with the first wireless communication unit when the first match indication is indicative of the first public key identification data not matching the third public key identification data but then, when the first match indication is indicative of the first public key identification data matching the third public key identification data perform
   generating the public key of the second communication unit in response to at least one of the first public key identification data and the third public key identification data;
   generating a first session key from the public key of the second communication unit and a private key of the first communication unit;
   generating a first network key by decrypting the first encrypted network key using the first session key; and
   communicating with the first wireless communication unit using the first network key, wherein the second communication unit transfers the first public key identification data to an NFC tag as an intermediate and the first communication unit reads the first public key identification data from the NFC tag, or
   the first communication unit transfers the second public key identification data to an NFC tag as an intermediate and the second communication unit reads the second public key identification data from the NFC tag.

2. A wireless communication system comprising a first communication unit and a second communication unit,
   the first communication unit comprising:
   a first Near Field Communication (NFC) receiver including a first memory for receiving first public key identification data from the second communication unit using NFC, the first public key identification data being indicative of, but different from, a public key of the second communication unit;
   a first NFC transmitter for transmitting second public key identification data to the second communication unit using NFC, the second public key identification data being indicative of, but different from, a public key of the first communication unit;
   a first communication controller for performing wireless communication with a first wireless communication unit using an IEEE wireless protocol, the first communication controller being arranged to transmit public key identification data indicative of, but different from, the public key of the first communication unit to the first wireless communication unit and to receive third public key identification data and a first encrypted network key from the first wireless communication unit, the third public key identification data indicative of, but different from, the public key of the second communication unit;
   a first comparator for generating a first match indication indicative of whether the first public key identification data matches the third public key identification data;
   wherein the first communication controller is arranged to terminate the wireless communication with the first wireless communication unit when the first match indication is indicative of the first public key identification data not matching the third public key identification data but then, when the first match indication is indicative of the first public key identification data matching the third public key identification data;

generate the public key of the second communication unit in response to at least one of the first public key identification data and the third public key identification data, generate a first session key from the public key of the second communication unit and a private key of the first communication unit, generate a first network key by decrypting the first encrypted network key using the first session key, and communicate with the first wireless communication unit using the first network key; and the second communication unit comprising:

a second NFC receiver including a second memory for receiving the second public key identification data from the first communication unit using NFC;

a second NFC transmitter for transmitting the first public key identification data to the first communication unit using NFC, the first public key identification data being indicative of, but different from, a public key of the second communication unit;

a second communication controller for performing wireless communication with a second wireless communication unit using the IEEE wireless protocol, the second communication controller being arranged to adapt transmit public key identification data indicative of, but different from, the public key of the second communication unit to the second wireless communication unit and to receive fourth public key identification data from the second wireless communication unit, the fourth public key identification data indicative of, but different from, the public key of the first communication unit;

a second comparator for generating a second match indication indicative of whether the second public key identification data matches the fourth public key identification data; a wherein the second communication controller is arranged to terminate the wireless communication with the second wireless communication unit when the second match indication is indicative of the second public key identification data not matching the fourth public key identification data but then, when the second match indication is indicative of the second public key identification data matching the fourth public key identification data:

generate the public key of the first communication unit in response to at least one of the second public key identification data and the fourth public key identification data, generate a second session key from the public key of the first communication unit and a private key of the second communication unit, generate a second network key;

generate a second encrypted network key by encrypting the second network key using the second session key, and transmit the second encrypted network key and public key identification data indicative of a public key of the second communication unit to the second wireless communication unit; wherein the second communication unit transfers the first public key identification data to an NFC tag as an intermediate and the first communication unit reads the first public key identification data from the NFC tag, or the first communication unit transfers the second public key identification data to an NFC tag as an intermediate and the second communication unit reads the second public key identification data from the NFC tag.

3. The wireless communication system of claim 2 wherein at least one of the first public key identification data and the third public key identification data comprises a hash of the public key of the second communication unit.

4. The wireless communication system of claim 2, wherein the first comparator is arranged to determine a first key from the first public key identification data and a second key from the third public key identification data, and to generate the first match indication in response to a comparison of the first key and the second key.

5. The wireless communication system of claim 2, wherein the first public key identification data comprises a first hash of the public key of the second communication unit; and the first match indicator is arranged to determine the public key of the second communication unit from the third public key identification data; to generate a second hash from the generated public key of the second communication unit; and to generate the first match indication in response to a comparison of the first hash and the second hash.

6. The communication unit of claim 2, wherein the second communication unit is further arranged to transmit wireless configuration data to the first communication unit by NFC, and the first communication controller is arranged to adapt the wireless communication in response to the wireless configuration data.

7. The communication unit of claim 2, wherein the first communication unit is arranged to transmit secret data to the second communication unit only if the first match indication is indicative of the first public key identification data matching the third public key identification data.

8. The communication unit of claim 7, wherein the first communication unit is arranged to transmit the secret data to the second communication unit via a wireless communication link.

9. The wireless communication system of claim 2, wherein the NFC is performed using an NFC peer-to-peer communication link between the first communication unit and the second communication unit.

10. The wireless communication system of claim 2, wherein the second communication unit is arranged to transfer the first public key identification data to an NFC tag; and the first NFC receiver is arranged to read the first public key identification data from the NFC tag by an NFC read operation.

11. The wireless communication system of claim 2, wherein the first communication unit is arranged to transfer the second public key identification data to an NFC tag; and the second NFC receiver is arranged to read the second public key identification data from the NFC tag by an NFC read operation.

12. The wireless communication system of claim 2, wherein the first communication unit is arranged to transmit an authentication failure message to the second communication unit in response to a detection that the first match indication is indicative of the first public key identification data not matching the third public key identification data.

13. The wireless communication system of claim 2, wherein the second communication unit is arranged to transmit an authentication failure message to the first communication unit in response to a detection that the second match indication is indicative of the second public key identification data not matching the fourth public key identification data.

14. The wireless communication system of claim 2, wherein the first communication unit and the second communication unit are arranged to initiate a communication setup in accordance with IEEE wireless Simple Configuration specification.

15. A communication unit for wireless communication system, the communication unit comprising:
- an Near Field Communication (NFC) receiver including a first memory for receiving first public key identification data from another communication unit using NFC, the first public key identification data indicative of, but different from, the public key of the other communication unit;
- an NFC transmitter for transmitting second public key identification data to the other communication unit using NFC, the second public key identification data being indicative of, but different from, a public key of the communication unit;
- a communication controller for performing wireless communication with a wireless communication unit using an IEEE wireless protocol, the communication controller being arranged to transmit public key identification data indicative of, but different from, the public key of the communication unit to the wireless communication unit and to receive third public key identification data and an encrypted network key from the wireless communication unit the third public key identification data indicative of, but different from, the public key of the other communication unit;
- a comparator for generating a first indication indicative of whether the first public key identification data matches the third public key identification data;
- wherein the communication controller is arranged to terminate the wireless communication with the wireless communication unit when the match indication is indicative of the first public key identification data not matching the third public key identification data but then, when the match indication is indicative of the first public key identification data matching the third public key identification data:
- generate the public key of the other communication unit in response to at least one of the first public key identification data and the third public key identification data,
- generate a session key from the public key of the other communication unit and a private key of the communication unit,
- generate a network key by decrypting the encrypted network key using the session key, and
- communicate with the wireless communication unit using the network key; wherein the second communication unit transfers the first public key identification data to an NFC tag as an intermediate and the first communication unit reads the first public key identification data from the NFC tag, or
- the first communication unit transfers the second public key identification data to an NFC tag as an intermediate and the second communication unit reads the second public key identification data from the NFC tag.

16. A communication unit for wireless communication system, the communication unit comprising:
- an Near Field Communication (NFC) receiver including a first memory for receiving first public key identification data from another communication unit using NFC, the first public key identification data indicative of, but different from, the public key of the other communication unit;
- an NFC transmitter for transmitting second public key identification data to the other communication unit using NFC, the second public key identification data being indicative of, but different from, a public key of the communication unit;
- a communication controller for performing wireless communication with a wireless communication unit using IEEE wireless protocol, the communication controller being arranged to transmit public key identification data indicative of, but different from, the public key of the communication unit to the wireless communication unit and to receive third public key identification data from the wireless communication unit, the third public key identification data indicative of, but different from, the public key of the other communication unit;
- a comparator for generating a match indication indicative of whether the first public key identification data matches the third public key identification data;
- wherein the communication controller is arranged to terminate the wireless communication with the wireless communication unit when the match indication is indicative of the first public key identification data not matching the third public key identification data but then, when the match indication is indicative of the first public key identification data matching the third public key identification data:
- generate the public key of the other communication unit in response to at least one of the first public key identification data and the third public key identification data,
- generate a session key from the public key of the other communication unit and a private key of the communication unit,
- generate a network key,
- generate an encrypted network key by encrypting the network key using the session key, and
- transmit the encrypted network key and public key identification data indicative of a public key of the communication unit to the wireless communication unit; wherein the second communication unit transfers the first public key identification data to an NFC tag as an intermediate and the first communication unit reads the first public key identification data from the NFC tag, or
- the first communication unit transfers the second public key identification data to an NFC tag as an intermediate and the second communication unit reads the second public key identification data from the NFC tag.

* * * * *